(12) United States Patent
Fujieda

(10) Patent No.: US 12,165,305 B2
(45) Date of Patent: Dec. 10, 2024

(54) IMAGE PROCESSING SYSTEM THAT PERFORMS IMAGE MEASUREMENT ON TARGET AND ADJUST AT LEAST ONE OF EMISSION INTENSITY AND EMISSION COLOR FOR LIGHTING ELEMENTS, SETTING METHOD, AND PROGRAM

(71) Applicant: OMRON Corporation, Kyoto (JP)

(72) Inventor: Shiro Fujieda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 320 days.

(21) Appl. No.: 17/762,868

(22) PCT Filed: Mar. 10, 2020

(86) PCT No.: PCT/JP2020/010282
§ 371 (c)(1),
(2) Date: Mar. 23, 2022

(87) PCT Pub. No.: WO2021/084773
PCT Pub. Date: May 6, 2021

(65) Prior Publication Data
US 2022/0358639 A1 Nov. 10, 2022

(30) Foreign Application Priority Data
Oct. 29, 2019 (JP) .................. 2019-196314

(51) Int. Cl.
*G06T 7/00* (2017.01)
*G06T 7/13* (2017.01)
(Continued)

(52) U.S. Cl.
CPC ............. *G06T 7/0006* (2013.01); *G06T 7/13* (2017.01); *G06T 7/521* (2017.01); *G06T 7/60* (2013.01);
(Continued)

(58) Field of Classification Search
None
See application file for complete search history.

(56) References Cited

U.S. PATENT DOCUMENTS 9,036,198 B2 * 5/2015 Miyadera ........... H04N 1/02815
358/518
9,299,189 B1 * 3/2016 Chater .................. G06T 15/506
(Continued)

FOREIGN PATENT DOCUMENTS

CN 107220931 A 9/2017
CN 110196576 A 9/2019
(Continued)

OTHER PUBLICATIONS

International Search report of PCT/JP2020/010282 dated Jul. 7, 2020 [PCT/ISA/210].
(Continued)

Primary Examiner — Haris Sabah
(74) Attorney, Agent, or Firm — Sughrue Mion, PLLC

(57) ABSTRACT

An image processing system includes one or more processors that select one target algorithm from evaluation algorithms, calculate an evaluation value indicating adaptation to image measurement using the target algorithm and one or more evaluation images corresponding to an evaluation lighting pattern for each evaluation lighting pattern, and determine a lighting pattern to be used for the image measurement from evaluation lighting patterns based on the evaluation value.

14 Claims, 22 Drawing Sheets

(51) Int. Cl.
  *G06T 7/521* (2017.01)
  *G06T 7/60* (2017.01)
  *G06T 7/73* (2017.01)
  *H04N 1/00* (2006.01)
  *H04N 1/48* (2006.01)
  *H04N 1/60* (2006.01)

(52) U.S. Cl.
  CPC ............ *G06T 7/73* (2017.01); *G06T 2200/24* (2013.01); *G06T 2207/10152* (2013.01); *G06T 2207/30164* (2013.01); *H04N 1/00135* (2013.01); *H04N 1/484* (2013.01); *H04N 1/60* (2013.01)

(56) References Cited

U.S. PATENT DOCUMENTS

| | | | |
|---|---|---|---|
| 2004/0184653 | A1 | 9/2004 | Baer et al. |
| 2015/0277324 | A1* | 10/2015 | Goto .................. G03G 15/5058 399/72 |
| 2015/0301468 | A1* | 10/2015 | Adachi .............. G03G 15/0189 399/301 |
| 2017/0069075 | A1 | 3/2017 | Okuda |
| 2018/0198532 | A1* | 7/2018 | Kikuchi .................. G06T 7/248 |
| 2018/0336691 | A1* | 11/2018 | Suzuki .................... G06T 7/521 |
| 2019/0268517 | A1 | 8/2019 | Hwang et al. |

FOREIGN PATENT DOCUMENTS

| | | |
|---|---|---|
| JP | 7-037094 A | 2/1995 |
| JP | 7-220058 A | 8/1995 |
| JP | 2003-270163 A | 9/2003 |
| JP | 2017-049974 A | 3/2017 |
| JP | 2017-156161 A | 9/2017 |
| JP | 2018-189558 A | 11/2018 |

OTHER PUBLICATIONS

Written Opinion of PCT/JP2020/010282 dated Jul. 7, 2020 [PCT/ISA/237].

Japanese Office Action issued May 16, 2023, in Application No. 2019-196314.

Chinese Office Action issued Jun. 28, 2024 in Chinese Application No. 202080067903.5.

* cited by examiner

FIG.17

| LIGHTING PATTERN No. | LIGHTING PATTERN DETAIL INFORMATION | EVALUATION VALUE (FIRST TIME) | EVALUATION VALUE (SECOND TIME) | ... |
|---|---|---|---|---|
| 0 | LIGHTING ELEMENT: 41, 42L, ... BRIGHTNESS: 120 COLOR: WHITE | 4.71 | 4.72 | ... |
| 1 | LIGHTING ELEMENT: 41, 42L, ... BRIGHTNESS: 100 COLOR: WHITE | 8.43 | 8.39 | ... |
| ⋮ | ⋮ | ⋮ | ⋮ | ⋮ |

(a)

| P-No. | Data0 | Data1 | Data2 | Data3 | Data4 | Data5 | Data6 | Data7 |
|---|---|---|---|---|---|---|---|---|
| 0 | 4.71 | 4.72 | 4.71 | 4.71 | 4.74 | 4.76 | 4.77 | 4.75 |
| 1 | 8.43 | 8.39 | 8.35 | 8.37 | 8.36 | 8.39 | 8.41 | 8.39 |
| 2 | 11.84 | 11.81 | 11.77 | 11.81 | 11.80 | 11.79 | 11.84 | 11.79 |
| 3 | 15.29 | 15.35 | 15.32 | 15.24 | 15.15 | 15.20 | 15.32 | 15.26 |
| 4 | 10.79 | 10.97 | 11.00 | 10.90 | 10.91 | 10.92 | 10.91 | 10.84 |
| 5 | 6.71 | 6.94 | 6.95 | 6.88 | 6.98 | 6.91 | 6.88 | 6.77 |
| 6 | 4.04 | 4.02 | 4.00 | 4.02 | 4.01 | 4.02 | 4.01 | 4.04 |
| 7 | 7.26 | 7.23 | 7.23 | 7.21 | 7.20 | 7.21 | 7.23 | 7.26 |
| 8 | 10.32 | 10.30 | 10.24 | 10.27 | 10.32 | 10.29 | 10.29 | 10.34 |
| 9 | 13.44 | 13.40 | 13.32 | 13.39 | 13.39 | 13.34 | 13.45 | 13.42 |
| 10 | 15.70 | 15.70 | 15.71 | 15.73 | 15.72 | 15.76 | 15.68 | 15.71 |
|  |  |  |  | 11.87 | 11.82 | 11.81 | 11.75 | 11.81 |

(b)

| P-No. | Data0 | Data1 | Data2 | Data3 | Data4 | Data5 | Data6 | Data7 |
|---|---|---|---|---|---|---|---|---|
| 53 | 23.28 | 23.31 | 23.37 | 23.28 | 23.28 | 23.43 | 23.47 | 23.48 |
| 52 | 19.70 | 19.76 | 19.83 | 19.71 | 19.81 | 19.89 | 19.82 | 19.81 |
| 41 | 17.12 | 17.11 | 17.16 | 17.09 | 17.08 | 17.19 | 17.13 | 17.24 |
| 51 | 16.02 | 15.99 | 16.02 | 15.93 | 16.09 | 16.06 | 16.11 | 16.06 |
| 10 | 15.70 | 15.70 | 15.71 | 15.73 | 15.72 | 15.76 | 15.68 | 15.71 |
| 47 | 15.44 | 15.33 | 15.55 | 15.29 | 15.50 | 15.50 | 15.50 | 15.57 |
| 3 | 15.29 | 15.35 | 15.32 | 15.24 | 15.15 | 15.20 | 15.32 | 15.26 |
| 40 | 14.47 | 14.45 | 14.44 | 14.43 | 14.46 | 14.50 | 14.49 | 14.55 |
| 9 | 13.44 | 13.40 | 13.32 | 13.39 | 13.39 | 13.34 | 13.45 | 13.42 |
| 46 | 13.07 | 13.09 | 13.17 | 13.10 | 13.13 | 13.15 | 13.16 | 13.19 |
| 35 | 12.81 | 12.66 | 12.71 | 12.77 | 12.78 | 12.85 | 12.80 | 12.77 |
|  |  |  | 12.51 | 12.56 | 12.56 | 12.57 | 12.66 |  |

(a) LIGHTING PATTERN No. 29

— 90

(b) LIGHTING PATTERN No. 7

— 90

(c) LIGHTING PATTERN No. 44

— 90

(d) LIGHTING PATTERN No. 40

| LIGHTING PATTERN No. | $\sigma'$ ($\kappa=1$) | | | | | |
|---|---|---|---|---|---|---|
| | $\lambda=0$ | $\lambda=1$ | $\lambda=2$ | $\lambda=3$ | $\lambda=4$ | $\lambda=5$ |
| ⋮ | ⋮ | ⋮ | ⋮ | ⋮ | ⋮ | ⋮ |
| 7 | 1 | 1 | 1 | 1.3253 | 1.767 | 2.2088 |
| ⋮ | ⋮ | ⋮ | ⋮ | ⋮ | ⋮ | ⋮ |
| 29 | 1 | 1.7004 | 3.4007 | 5.1011 | 6.8014 | 8.5018 |
| ⋮ | ⋮ | ⋮ | ⋮ | ⋮ | ⋮ | ⋮ |
| 40 | 1 | 1 | 1 | 1 | 1 | 1 |
| ⋮ | ⋮ | ⋮ | ⋮ | ⋮ | ⋮ | ⋮ |
| 44 | 1 | 1 | 1 | 1.0209 | 1.3612 | 1.7015 |
| ⋮ | ⋮ | ⋮ | ⋮ | ⋮ | ⋮ | ⋮ |

FIG.21

| LIGHTING PATTERN No. | EVALUATION VALUE E ($\kappa=1$) | | | | | |
|---|---|---|---|---|---|---|
| | $\lambda=0$ | $\lambda=1$ | $\lambda=2$ | $\lambda=3$ | $\lambda=4$ | $\lambda=5$ |
| ⋮ | ⋮ | ⋮ | ⋮ | ⋮ | ⋮ | ⋮ |
| 7 | 13.0894 | 13.0894 | 13.0894 | 9.8769 | 7.4077 | 5.9261 |
| ⋮ | ⋮ | ⋮ | ⋮ | ⋮ | ⋮ | ⋮ |
| 29 | 15.3083 | 9.003 | 4.5015 | 3.001 | 2.2507 | 1.8006 |
| ⋮ | ⋮ | ⋮ | ⋮ | ⋮ | ⋮ | ⋮ |
| 40 | 7.3082 | 7.3082 | 7.3082 | 7.3082 | 7.3082 | 7.3082 |
| ⋮ | ⋮ | ⋮ | ⋮ | ⋮ | ⋮ | ⋮ |
| 44 | 11.5265 | 11.5265 | 11.5265 | 11.2903 | 8.4677 | 6.7742 |
| ⋮ | ⋮ | ⋮ | ⋮ | ⋮ | ⋮ | ⋮ |

IMAGE PROCESSING SYSTEM THAT PERFORMS IMAGE MEASUREMENT ON TARGET AND ADJUST AT LEAST ONE OF EMISSION INTENSITY AND EMISSION COLOR FOR LIGHTING ELEMENTS, SETTING METHOD, AND PROGRAM

CROSS REFERENCE TO RELATED APPLICATIONS

This application is a National Stage of International Application No. PCT/JP2020/010282 filed on Mar. 10, 2020, claiming priority based on Japanese Patent Application No. 2019-196314 filed on Oct. 29, 2019, the entire contents of each of which being herein incorporated by reference in their entireties.

TECHNICAL FIELD

The present disclosure relates to an image processing system, a setting method, and a program.

BACKGROUND ART

An image processing technology in which a target is imaged under lighting by light from a lighting device to acquire information about the target from generated image data is used in a factory automation (FA) field and the like.

In the case of use of the lighting device having many settable conditions such as a color and a direction of lighting, an optimum lighting pattern is appropriately selected from a large number of lighting patterns. For example, Japanese Patent Laying-Open No. 2003-270163 (PTL 1) discloses a technique of calculating a lighting condition for optimizing an evaluation value based on a plurality of captured images obtained by imaging a condition setting article while changing the lighting condition and inspecting an inspection target article under the calculated light condition.

CITATION LIST

Patent Literature

PTL 1: Japanese Patent Laying-Open No. 2003-270163
PTL 2: Japanese Patent Laying-Open No. 7-220058

SUMMARY OF INVENTION

Technical Problem

In the technique disclosed in PTL 1, the lighting condition is optimized based on a uniform evaluation value. However, in image measurement using an external appearance image of the target, a method for evaluating adaptation to the image measurement may be different depending on a state of the target or a content of the image processing performed on the external appearance image. Consequently, the lighting condition optimized based on the uniform evaluation value may not be suitable for the image measurement.

The present disclosure has been made in view of the above problems, and an object of the present disclosure is to provide an image processing system, a setting method, and a program capable of more easily performing lighting setting of the illumination so as to be suitable for the image measurement using the external appearance image of the target.

Solution to Problem

According to an example of the present disclosure, an image processing system that performs image measurement using an external appearance image of a target includes: an imaging unit that images a target and a lighting unit that includes a plurality of lighting elements that irradiates the target with light and is capable of adjusting at least one of emission intensity and emission color for each lighting element. The image processing system further includes an image acquisition unit, a selection unit, a calculation unit, and a pattern determination unit. The image acquisition unit emits illumination light from the lighting unit according to each of a plurality of evaluation lighting patterns different from each other, and acquires at least one evaluation image corresponding to each evaluation lighting pattern from the imaging unit. The selection unit selects one target algorithm from a plurality of evaluation algorithms. For each evaluation lighting pattern, the calculation unit calculates the evaluation value indicating the adaptation to the image measurement using the target algorithm and at least one evaluation image corresponding to the evaluation lighting pattern. The pattern determination unit determines the lighting pattern to be used for the image measurement from among the plurality of evaluation lighting patterns based on the evaluation value.

According to this disclosure, the evaluation algorithm suitable for the image measurement is selected from the plurality of evaluation algorithms, so that the lighting pattern optimal for the image measurement is automatically determined as the measurement lighting pattern. Thus, the lighting setting of the illumination can be easily performed so as to be suitable for the image measurement using the external appearance image of the target.

In the above disclosure, the plurality of evaluation algorithms include a first algorithm and at least one second algorithm. The first algorithm outputs a first evaluation value depending on a difference between at least one first region and at least one second region in at least one evaluation image as the evaluation value. The at least one second algorithm outputs a second evaluation value depending on uniformity of the at least one second region as the evaluation value.

For example, in the image measurement detecting the defect on the surface of target, the image processing is performed in order to emphasize the defect portion. When the image processing capable of emphasizing the background together with the defect portion is performed, the lighting pattern in which the background is as uniform as possible is preferable. According to the above disclosure, the region including the defect is set as the first region, the region of the background not including the defect is set as the second region, and the second algorithm is selected as the target algorithm, so that the lighting pattern in which the background is uniform can be determined as the measurement lighting pattern. On the other hand, when the image processing in which the background is not so emphasized is performed, the lighting pattern in which the difference between the defect portion and the background increases is preferable. In such a case, the first algorithm is selected as the target algorithm, so that the lighting pattern in which the difference between the defect portion and the background increases can be determined as the measurement lighting pattern.

In the above disclosure, at least one second algorithm includes a plurality of second algorithms having different contribution rates of the uniformity to the second evaluation value.

According to the above disclosure, the second algorithm having the contribution rate suitable for the image measurement can be selected from the plurality of second algorithms. Thus, the lighting pattern suitable for the image measurement is determined as the measurement lighting pattern.

In the above disclosure, for example, each of at least one second algorithm outputs the second evaluation value using the threshold value when the value corresponding to the variance of the luminance of the plurality of pixels belonging to at least one second region is smaller than the threshold value, and each of at least one second algorithm outputs the second evaluation value using the value corresponding to the variance when the value corresponding to the variance is greater than or equal to the threshold value. The threshold value is set according to at least one second algorithm.

In the above disclosure, the image processing system further includes a user interface. The calculation unit determines a shape, a size, and a position of at least one first region according to input to the user interface. The calculation unit sets the shape and size of at least one second region to be identical to the shape and size of at least one first region. The calculation unit determines the position of at least one second region according to the input to the user interface.

According to the present disclosure, the user does not need to set the shape and size of the second region by setting the shape, size, and position of the first region. As a result, labor required for setting the second region is reduced.

In the above disclosure, the plurality of evaluation algorithms outputs a third evaluation value indicating an edge-likelihood of a pixel belonging to a designated region in at least one evaluation image using edge patterns different from each other as the evaluation value.

According to this disclosure, for example, when the surface of the target has a line or a pattern extending in a certain direction, an evaluation lighting pattern that emphasizes the line or the pattern is determined as a lighting pattern to be used for image measurement by selecting an evaluation algorithm corresponding to the direction.

In the above disclosure, at least one evaluation image includes a plurality of evaluation images. The calculation unit calculates the evaluation value for each of the plurality of evaluation images. The pattern determination unit extracts the lowest evaluation value having the lowest adaptation from the evaluation values for the plurality of evaluation images for each evaluation lighting pattern. The pattern determination unit determines the evaluation lighting pattern in which the lowest evaluation value having the highest adaptation is extracted from the plurality of evaluation lighting patterns as the lighting pattern to be used for the image measurement.

According to the present disclosure, the lighting pattern stably having high adaptation is determined as the lighting pattern to be used for the image measurement.

In the above disclosure, the plurality of lighting patterns that can be taken by the lighting unit are previously divided into a plurality of groups. The image acquisition unit selects at least one group from the plurality of groups, and determines the plurality of lighting patterns belonging to the selected at least one group as a plurality of evaluation lighting patterns.

According to this disclosure, even when the total number of lighting patterns that can be taken by the lighting unit is enormous, the group suitable for the image measurement is selected, so that the time required for determining the lighting pattern to be used for the image measurement can be shortened.

In the above disclosure, the plurality of lighting elements are radially arranged along the first to Nth radial directions at equal angular intervals. N is an integer greater than or equal to 2. The plurality of groups include a first group including the plurality of lighting patterns in which the irradiation intensity of the first to Nth radial directions is uniform and a second group including the plurality of lighting patterns in which only the lighting element disposed in one of the first to Nth radial directions is turned on.

In the above disclosure, N is an even number greater than or equal to 4. The plurality of groups may further include a third group including the plurality of lighting patterns in which only lighting elements arranged along a pair of radial directions opposite to each other in the first to Nth radial directions are turned on.

In the above disclosure, the plurality of groups may include a first group including the plurality of lighting patterns in which the emission color of the plurality of lighting elements is white and a second group including the plurality of lighting patterns in which the emission color of the plurality of lighting elements is a color other than white.

In the above disclosure, the image processing system further includes a user interface. The selection unit selects the target algorithm according to the input to the user interface.

According to this disclosure, the user can select the evaluation algorithm suitable for the image measurement as the target algorithm.

According to an example of the present disclosure, a setting method for performing lighting setting of a lighting unit that includes a plurality of lighting elements irradiating a target with light and is capable of adjusting at least one of emission intensity and emission color for each lighting element includes the following first to fourth steps. The first step is a step of emitting illumination light from the lighting unit according to each of a plurality of evaluation lighting patterns different from each other, and acquiring at least one evaluation image corresponding to each evaluation lighting pattern from the imaging unit that images the target. The second step is a step of selecting one target algorithm from the plurality of evaluation algorithms. For each evaluation lighting pattern, the third step is a step of calculating the evaluation value indicating the adaptation to the image measurement in which the external appearance image of the target is used using the target algorithm and at least one evaluation image corresponding to the evaluation lighting pattern. The fourth step is a step of determining the lighting pattern to be used for the image measurement from the plurality of evaluation lighting patterns based on the evaluation value.

According to still another example of the present disclosure, a program causes a computer to execute the above setting method. According to these disclosures, the lighting setting of the illumination can be more easily performed so as to be suitable for the image measurement using the external appearance image of the target.

Advantageous Effects of Invention

According to the present disclosure, the lighting setting of the illumination can be more easily performed so as to be suitable for the image measurement using the external appearance image of the target.

BRIEF DESCRIPTION OF DRAWINGS

FIG. 17 is a view illustrating an example of evaluation value data.

FIG. 20 is a view illustrating a value of a' calculated from the evaluation image in FIG. 19.

FIG. 21 is a view illustrating an evaluation value E calculated from the evaluation image in FIG. 19.

FIG. 23 is a view illustrating an example of eight edge patterns.

DESCRIPTION OF EMBODIMENTS

Figure 1:
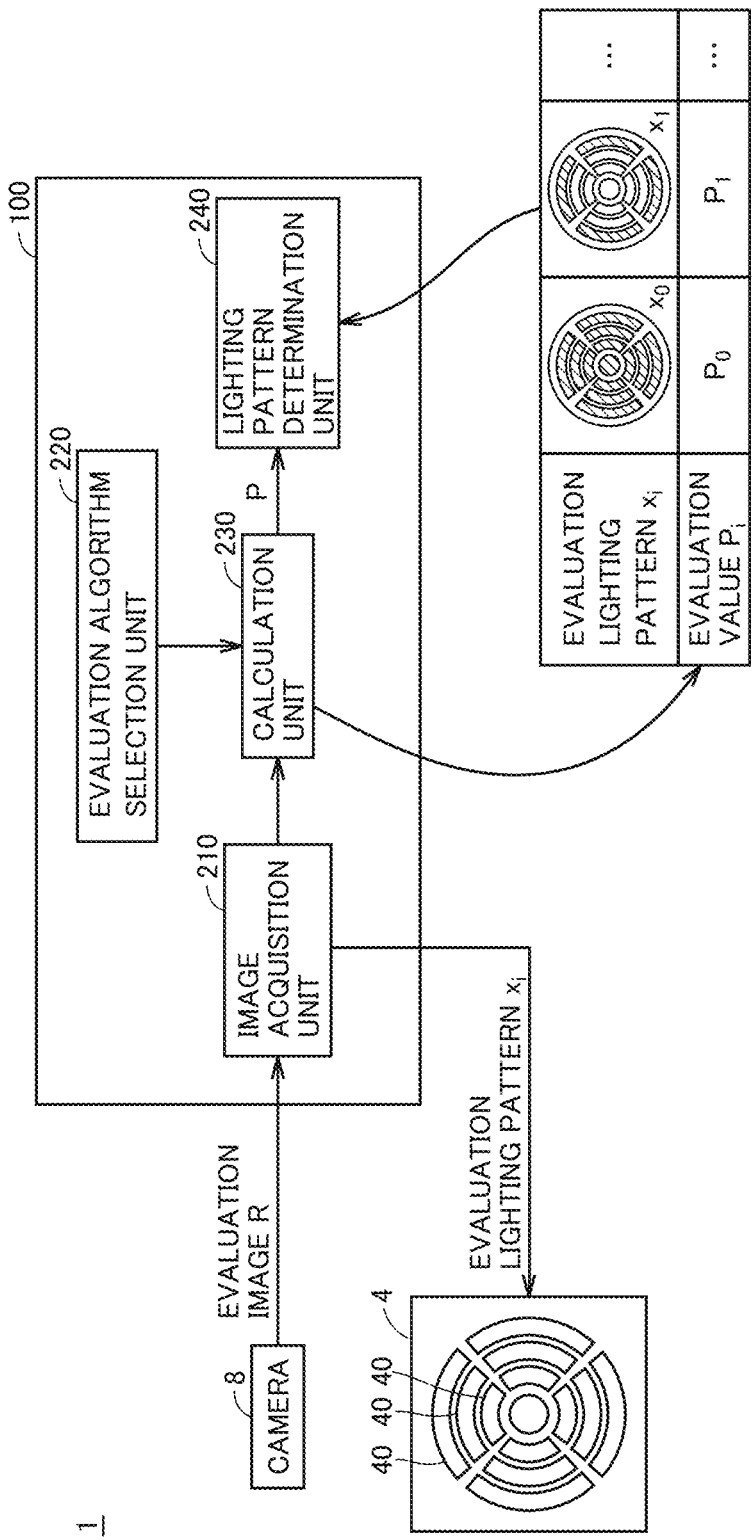
FIG. 1 is a view illustrating a configuration example of an image processing system.

With reference to the drawings, an embodiment of the present invention will be described in detail. The same or equivalent portion in the drawings is denoted by the same reference numeral, and the description will not be repeated.

§ 1 Application Example

With reference to FIG. 1, an application example of the present invention will be described. FIG. 1 is a view illustrating a configuration example of an image processing system.

An image processing system 1 illustrated in FIG. 1 is a system that performs image measurement using an external appearance image of a target. Image processing system 1 includes a camera 8 that is an example of an imaging unit that images the target, a lighting device 4 that is an example of an irradiation unit that irradiates the target with light, and a control device 100 that controls processing executed in image processing system 1.

Lighting device 4 includes a plurality of lighting elements 40 that irradiate the target with light. In the example of FIG. 1, lighting device 4 includes 13 lighting elements 40. In FIG. 1, a reference numeral of the lighting element 40 is partially omitted. The number of lighting elements 40 is not limited to the example in FIG. 1, but may be at least two. The sizes of lighting elements 40 may be different from each other, or may be common to each other. Lighting elements 40 may be arranged on the same plane, arranged on planes different from each other, or arranged to be able to irradiate the target with light from lighting elements 40. Lighting device 4 can adjust emission intensity and an emission color for each lighting element 40. At this point, the fact that the emission intensity can be adjusted includes not only turn-on or -off of each lighting element 40 but also gradual adjustment of the intensity of light emitted from each lighting element 40.

Control device 100 typically has a structure according to a general-purpose computer architecture. Control device 100 includes an image acquisition unit 210, an evaluation algorithm selection unit 220, a calculation unit 230, and a lighting pattern determination unit 240. Typically, image acquisition unit 210, evaluation algorithm selection unit 220, calculation unit 230, and lighting pattern determination unit 240 are implemented by a CPU included in control device 100, the CPU executing a program stored in control device 100 or the like.

Image acquisition unit 210 irradiates the target with the illumination light from lighting device 4 according to each of a plurality of evaluation lighting patterns xi different from each other, and acquires at least one evaluation image R corresponding to each evaluation lighting pattern xi from camera 8. The lighting pattern defines the emission intensity and the emission color of each lighting element 40.

Evaluation algorithm selection unit 220 selects one evaluation algorithm as a target algorithm from the plurality of evaluation algorithms. The evaluation algorithm defines a calculation method for calculating an evaluation value indicating adaptation of the lighting pattern to the image measurement using the evaluation image. The evaluation algorithm is represented by a function, a program, or the like calculating the evaluation value.

The plurality of evaluation algorithms are previously set according to various methods used in the image measurement using the external appearance image of the target. For example, when the image measurement inspecting the defect on the surface of the target is performed, the following first algorithm and second algorithm are previously set. The first algorithm is an algorithm calculating a first evaluation value depending on a difference between a defect region including a defect portion and a background region not including the defect portion. The second algorithm is an algorithm calculating a second evaluation value depending on uniformity of the background region. The first evaluation value does not depend on the uniformity of the background region. The second evaluation value may also depend on the difference between the defect region and the background region.

In the image measurement detecting the defect, the image processing emphasizing the defect portion can be executed on the external appearance image. Various methods are known as the image processing, and there are image processing in which the background can be emphasized together with the defect portion and image processing in which the background is hardly emphasized. For example, Sobel filter processing can be cited as the image processing that can emphasize the background. For example, Hough transform processing can be cited as the image processing in which the background is hardly emphasized.

When the image measurement including the image processing in which the background is hardly emphasized is performed, the lighting condition in which the difference between the defect region and the background region is large is preferable without considering the uniformity of the background region. In this case, the first algorithm is selected. On the other hand, when the image measurement is performed using image processing that can emphasize the background, the lighting condition that increases the uniformity of the background region is preferable. In this case, the second algorithm is selected.

For each evaluation lighting pattern xi, calculation unit 230 calculates an evaluation value Pi indicating the adaptation to the image measurement using the target algorithm and evaluation image R corresponding to evaluation lighting pattern xi. Specifically, calculation unit 230 calculates a feature amount from evaluation image R to apply the calculated feature amount to the target algorithm, thereby calculating evaluation value Pi corresponding to evaluation lighting pattern xi. Evaluation value Pi indicates how suitable evaluation lighting pattern xi is for the image measurement.

Lighting pattern determination unit 240 determines the measurement lighting pattern to be used for the image measurement based on evaluation value Pi calculated by calculation unit 230. Typically, lighting pattern determination unit 240 determines evaluation lighting pattern xi corresponding to evaluation value Pi indicating the value having the highest adaptation to the image measurement as the measurement lighting pattern.

According to image processing system 1 of the embodiment, the lighting pattern optimal for the image measurement is automatically determined as the measurement lighting pattern by selecting the evaluation algorithm suitable for the image measurement from among the plurality of evaluation algorithms. Thus, the lighting setting of the illumination can be easily performed so as to be suitable for the image measurement using the external appearance image of the target.

§ 2 Specific Example

A. Configuration of Image Processing System

Figure 2:
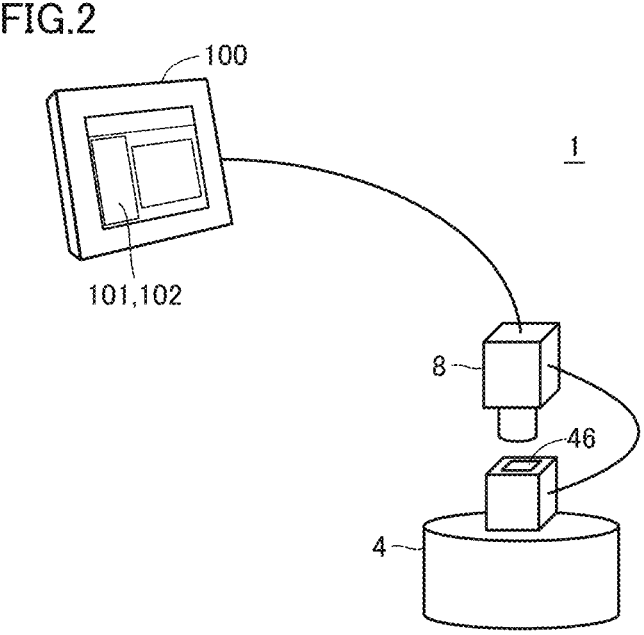
FIG. 2 is a schematic view illustrating a basic configuration of an image processing system 1.

FIG. 2 is a schematic diagram illustrating a basic configuration of image processing system 1. Image processing system 1 includes control device 100, camera 8, and lighting device 4 as main components. Control device 100 and camera 8 are connected so as to be able to communicate data with each other. Lighting device 4 is controlled by control device 100 through camera 8.

In the following description, for convenience of explanation, a direction in which light is emitted from lighting device 4 is defined as a Z-axis, a horizontal direction of a paper surface is defined as an X-axis, and an axis perpendicular to the X-axis and the Z-axis is defined as a Y-axis. In addition, a side irradiated with light is defined as a lower side.

An opening 46 is provided in the upper portion of lighting device 4 such that camera 8 can image a target W from above lighting device 4. In the embodiment, camera 8 is installed above lighting device 4. However, camera 8 may be installed such that at least a part of the irradiation region of lighting device 4 is included in at least a part of an imaging visual field of camera 8, and may be installed beside lighting device 4.

Camera 8 is an imaging unit that images a subject existing in the imaging visual field to generate the image. Camera 8 includes an optical system such as a lens or a diaphragm and a light receiving element such as a charge coupled device (CCD) image sensor or a complementary metal oxide semiconductor (CMOS) image sensor as main components.

Control device 100 can receive the setting of the content of the image processing separately from the execution of the image processing such as the inspection of the existence of the defect or the stain on target W, the measurement of the size, the arrangement, the orientation, or the like of target W, and the recognition of the character, the figure, or the like on the surface of target W. The setting of the content of the image processing includes setting of the imaging condition when the image is acquired and setting of a processing content executed on the image. The setting of the imaging condition includes the lighting setting for lighting device 4 and camera setting for camera 8. Control device 100 functions as a device performing the lighting setting for lighting device 4. A setting support device that performs the lighting setting for lighting device 4 may be provided separately from control device 100.

Control device 100 includes a display 101 and a touch panel 102 attached to a display surface of display 101 as a user interface. Display 101 typically includes a liquid crystal display, and for example, displays the setting content for the user. Touch panel 102 functions as an input unit inputting information regarding various settings. For example, the user operates touch panel 102 based on the information displayed on display 101, thereby being able to input setting information regarding the setting of the content of the image processing and to perform various settings. Although the input unit includes a touch panel, the input unit may include a keyboard, a mouse, or both of them.

B. Configuration of Lighting Device

Figure 3:
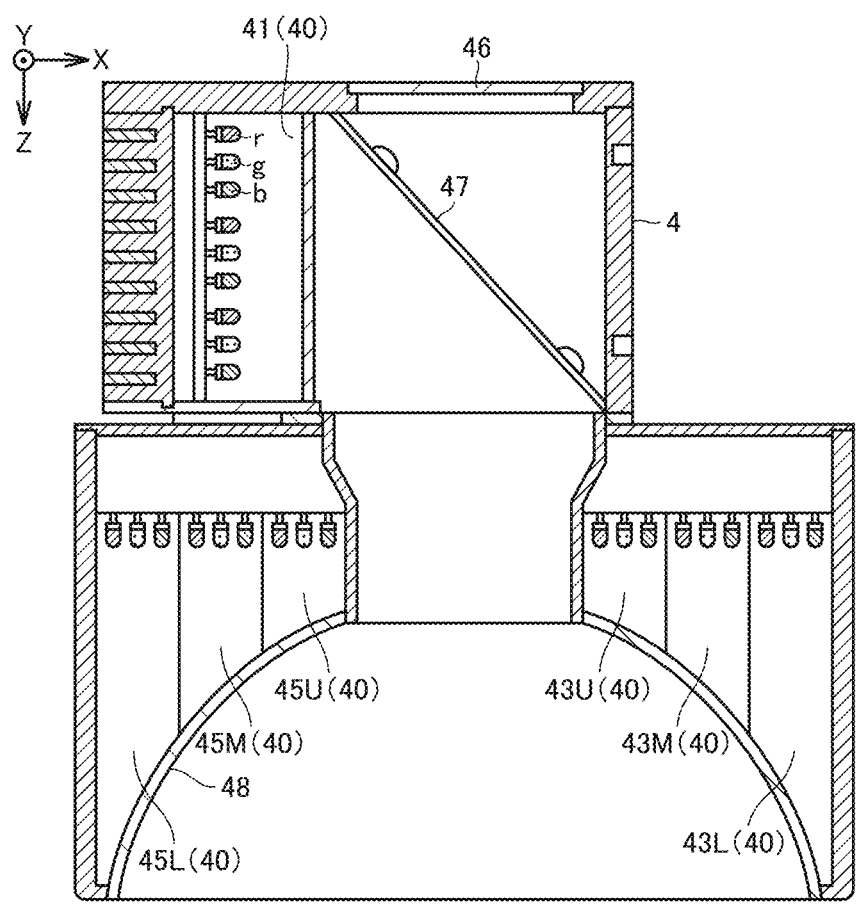
FIG. 3 is a view illustrating an XZ-section of a lighting device.
Figure 4:
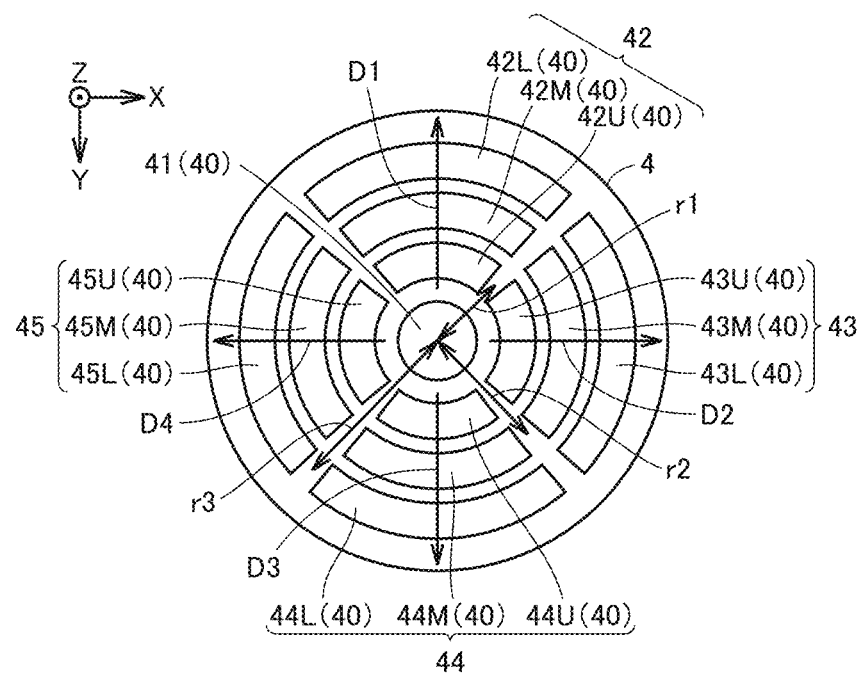
FIG. 4 is a bottom view of the lighting device.

With reference to FIGS. 3 and 4, a configuration of lighting device 4 will be described. FIG. 3 is a view illustrating an XZ-section of the lighting device. FIG. 4 is a bottom view of the lighting device.

A shape of lighting device 4 in FIG. 3 is a dome shape. In lighting device 4, a plurality of sets of a plurality of types of light emitting units (hereinafter, also referred to as a "light source") having different main wavelengths are provided at positions facing target W. Specifically, the plurality of sets of light sources including a red light source r, a green light source g, and a blue light source b are provided. In FIG. 3, the light source shaded obliquely downward to the left is red light source r, the light source shaded with a dot pattern is green light source g, and the light source shaded obliquely downward to the right is blue light source b, and reference numerals are partially omitted.

Lighting device 4 includes a plurality of lighting elements 40. One or a plurality of sets of light sources are provided in each lighting element 40. As illustrated in FIG. 4, the plurality of lighting elements 40 are arranged radially along a first radial direction D1 to a fourth radial direction D4 at 90° intervals. Specifically, the plurality of lighting elements 40 include a central lighting element 41, a lighting element 42 (42U, 42M, 42L) provided along first radial direction D1 from lighting element 41, a lighting element 43 (43U, 43M, 43L) provided along second radial direction D2 from lighting element 41, a lighting element 44 (44U, 44M, 44L) provided along third radial direction D3 from lighting element 41, and a lighting element 45 (45U, 45M, 45L) provided along fourth radial direction D4 from lighting element 41.

Incidence azimuths of the light emitted from lighting element 41 to 45 are different from each other. The incident azimuth is an azimuth centered on the Z-axis. The light emitted from the light source of lighting element 41 is reflected by a reflection plate 47 to travel parallel to the Z-axis. The light emitted from the light source of lighting element 42 travels in parallel to the Z axis, and then travels in the direction inclined to the opposite direction side to first radial direction D1 (see FIG. 4) by being transmitted through a diffusion plate 48 (see FIG. 3) formed in a dome shape. The light emitted from the light source of lighting element 43 travels in parallel to the Z axis, and then travels in the direction inclined to the opposite direction side to second radial direction D2 (see FIG. 4) by being transmitted through diffusion plate 48. The light emitted from the light source of lighting element 44 travels in parallel to the Z axis, and then travels in the direction inclined to the opposite direction side to third radial direction D3 (see FIG. 4) by being transmitted through diffusion plate 48. The light emitted from the light source of lighting element 45 travels in parallel to the Z axis, and then travels in the direction inclined to the opposite direction side to fourth radial direction D4 (see FIG. 4) by being transmitted through diffusion plate 48.

Lighting element 41 has a circular shape. Lighting elements 42 to 45 have an arcuate shape centered on lighting element 41.

Lighting elements 42U, 43U, 44U, 45U are annularly arranged such that distances (radius r1) from central lighting element 41 are the same. Lighting elements 42M, 43M, 44M, 45M are annularly arranged such that distances (radius r2>r1) from central lighting element 41 are the same. Lighting elements 42L, 43L, 44L, 45L are annularly arranged such that distances (radius r3>r2) from central lighting element 41 are the same. An incident angle of the light emitted from lighting elements 42U to 45U with respect to the XY-plane, an incident angle of the light emitted from lighting elements 42M to 45M with respect to the XY-plane, and an incident angle of the light emitted from lighting elements 42L to 45L with respect to the XY-plane are different from each other.

As described above, lighting device 4 includes 13 lighting elements 41, 42U to 45U, 42M to 45M, 42L to 45L. However, the number of lighting elements included in lighting device 4 is not limited to 13.

For example, in lighting device 4 of FIG. 4, the plurality of lighting elements 40 are arranged radially along first radial direction D1 to fourth radial direction D4, but the plurality of lighting elements 40 may be arranged radially along the first to Nth radial directions at equal angular intervals. N may be an integer greater than or equal to 2.

In lighting device 4 in FIG. 4, the number of lighting elements 40 arranged along each radial direction is 3, but the number of lighting elements 40 may be 2 or greater than or equal to 4.

The number of red light sources r, the number of green light sources g, and the number of blue light sources b that are arranged in each lighting element need not be identical to each other, and at least one light source for each of these three types of light sources may be arranged in each lighting element. In addition, the ratio of red light source r, green light source g, and blue light source b included in each lighting element may be the same or different. For example, one lighting element may have more red light sources r than other lighting elements. In the embodiment, it is assumed that the same number of red light sources r, green light sources g, and blue light sources b are arranged.

C. Hardware Configuration of Control Device 100

Figure 5:
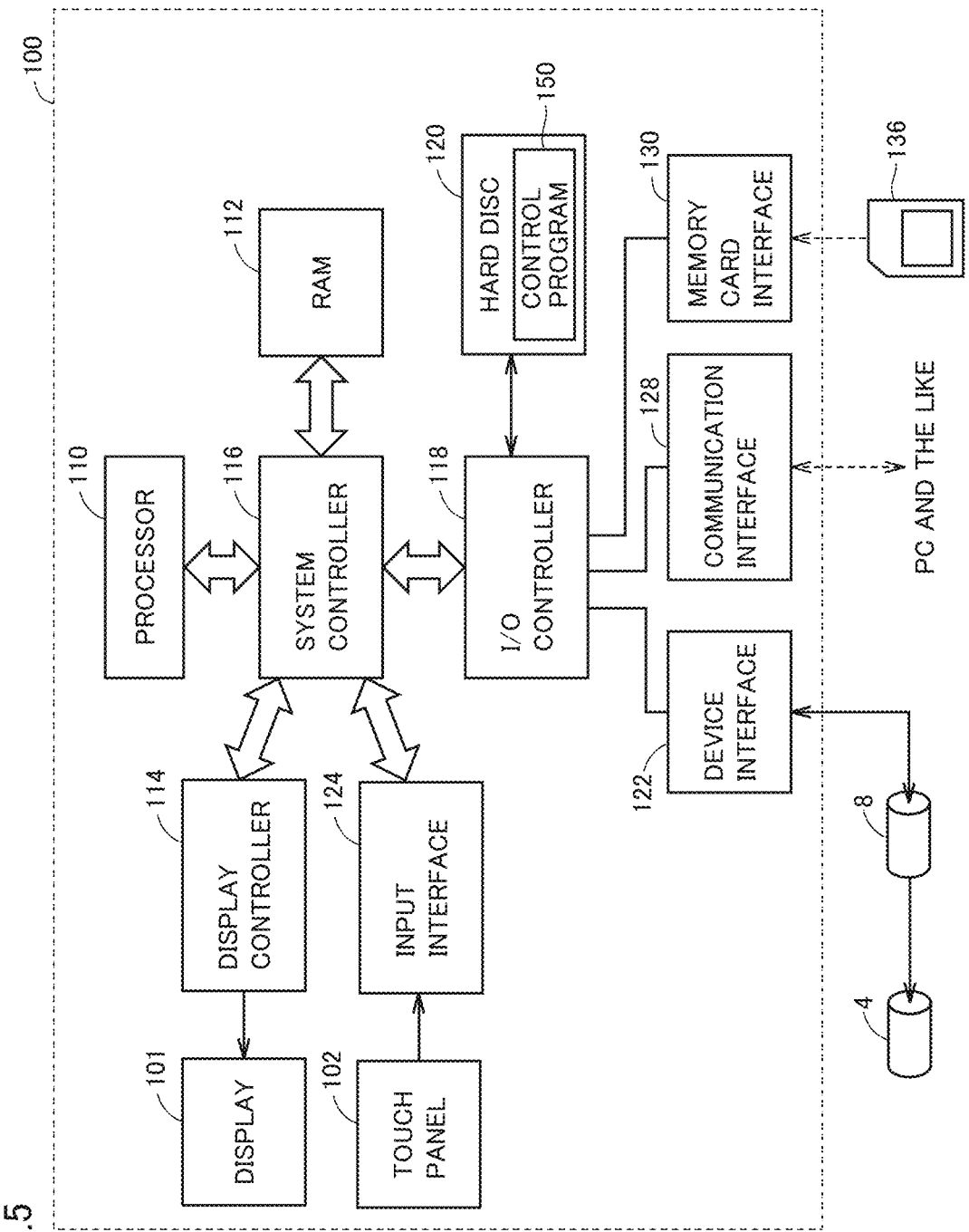
FIG. 5 is a schematic view illustrating a hardware configuration of a control device.

FIG. 5 is a schematic view illustrating a hardware configuration of the control device. As illustrated in FIG. 5, control device 100 typically has a structure according to a general-purpose computer architecture, and implements various processing as described later by the processor executing the previously-installed program.

More specifically, control device 100 includes a processor 110 such as a central processing unit (CPU) or a microprocessing unit (MPU), a random access memory (RAM) 112, a display controller 114, a system controller 116, an input output (I/O) controller 118, a hard disk 120, a device interface 122, an input interface 124, a communication interface 128, and a memory card interface 130. These units are data-communicably connected to each other around system controller 116.

Processor 110 exchanges a program (code) and the like with system controller 116, and executes the program and the like in a predetermined order, thereby implementing target arithmetic processing.

System controller 116 is connected to processor 110, RAM 112, display controller 114, input interface 124, and I/O controller 118 through a bus, exchanges data with each unit, and controls the entire processing of control device 100.

RAM 112 is typically a volatile storage device such as a dynamic random access memory (DRAM), and holds the program read from hard disk 120, the camera image acquired by camera 8, a processing result for the image, work data including the imaging condition, and the like.

Display controller 114 is connected to display 101, and outputs a signal in order to display various information to display 101 according to an internal command from system controller 116.

Input interface 124 is connected to touch panel 102, and transmits various information input from touch panel 102 to system controller 116.

I/O controller 118 controls data exchange with a recording medium or an external device connected to control device 100. More specifically, I/O controller 118 is connected to hard disk 120, device interface 122, communication interface 128, and memory card interface 130.

Hard disk 120 is typically a nonvolatile magnetic storage device, and stores various setting values and the like in addition to a control program 150 executed by processor 110. Control program 150 installed in hard disk 120 is distributed while stored in a memory card 136 or the like. A semiconductor storage device such as a flash memory or an optical storage device such as a digital versatile disk random access memory (DVD-RAM) may be adopted instead of hard disk 120.

Image acquisition unit 210, evaluation algorithm selection unit 220, calculation unit 230, and lighting pattern determination unit 240 in FIG. 1 are implemented by processor 110 executing control program 150.

Device interface 122 mediates data transmission between camera 8 and lighting device 4 and processor 110. Device interface 122 outputs an instruction according to the imaging condition instructed from processor 110 to camera 8 and lighting device 4. Device interface 122 acquires image data obtained by imaging target W, and mediates data transmission between processor 110 and camera 8.

Communication interface 128 mediates data transmission between processor 110 and another personal computer (not illustrated), a server device, or the like. Communication interface 128 typically includes Ethernet (registered trademark), a universal serial bus (USB), or the like.

Memory card interface 130 mediates data transmission between processor 110 and memory card 136 that is the recording medium. Memory card 136 is distributed while control program 150 and the like executed by control device 100 are stored in memory card 136, and memory card interface 130 reads the control program from memory card 136. Memory card 136 includes a general-purpose semiconductor storage device such as a secure digital (SD), a magnetic recording medium such as a flexible disk, an optical recording medium such as a compact disk read only memory (CD-ROM), or the like. Alternatively, the program downloaded from a distribution server or the like may be installed in control device 100 through communication interface 128.

When the computer having the structure following the general-purpose computer architecture is used, an operating system (OS) providing a basic function of the computer may be installed in addition to the application providing the function of the embodiment. In this case, control program 150 of the embodiment may call a required module in a predetermined order and/or timing among program modules provided as a part of the OS to execute processing.

Furthermore, control program 150 of the embodiment may be provided while incorporated in a part of another program. Also in this case, the program itself does not include modules included in another program combined as described above, and the processing is executed in cooperation with the other program. That is, the control program of the embodiment may be incorporated in such another program.

Alternatively, some or all of the functions provided by the execution of the control program 150 may be implemented as a dedicated hardware circuit.

D. Outline of Method for Determining Lighting Pattern

In the embodiment, control device 100 evaluates each evaluation lighting pattern based on evaluation image R acquired by imaging under mutually different evaluation lighting patterns, and determines the measurement lighting pattern to be used for the image measurement based on the evaluation result.

Figure 6:
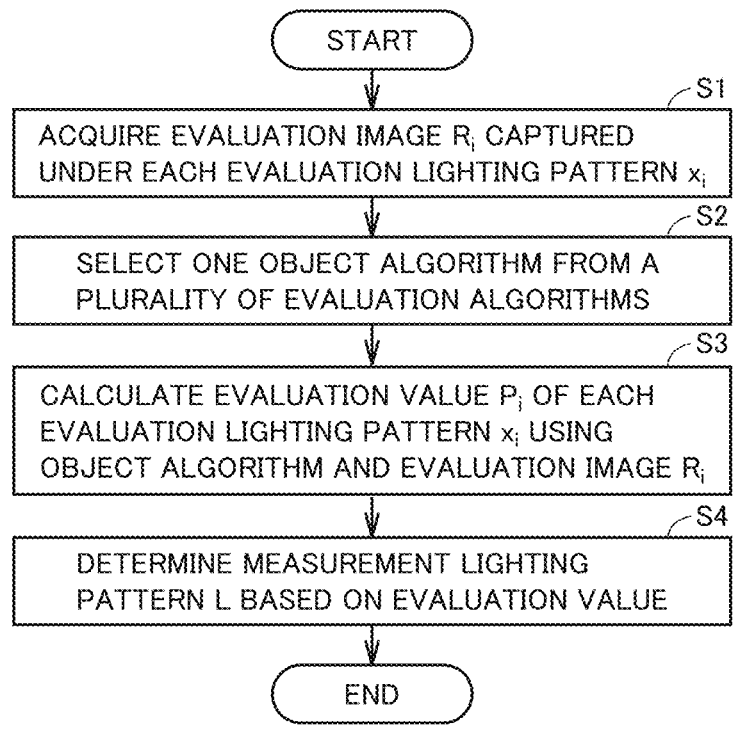
FIG. 6 is a flowchart illustrating a flow of determination of a measurement lighting pattern.

FIG. 6 is a flowchart illustrating a flow of the determination of the measurement lighting pattern. Control device 100 acquires an evaluation image Ri imaged under each evaluation lighting pattern xi (step S1). Control device 100 selects one target algorithm from a plurality of evaluation algorithms (step S2).

Subsequently, control device 100 calculates evaluation value Pi of evaluation lighting pattern xi using the target algorithm and evaluation image Ri (step S3). Control device 100 determines the measurement lighting pattern based on evaluation value Pi for each evaluation lighting pattern xi (step S4).

E. Example of Evaluation Algorithm

An example of the evaluation algorithm will be described below. In this case, an evaluation algorithm calculating the evaluation value indicating the adaptation of each evaluation lighting pattern to the defect inspection image measurement will be described.

The lighting pattern obtaining an image in which the defect portion is made conspicuous is preferable in order to inspect the defect of target W. Accordingly, at least one defect region including the defect portion and at least one background region not including the defect portion are previously set for evaluation image R.

Figure 7:
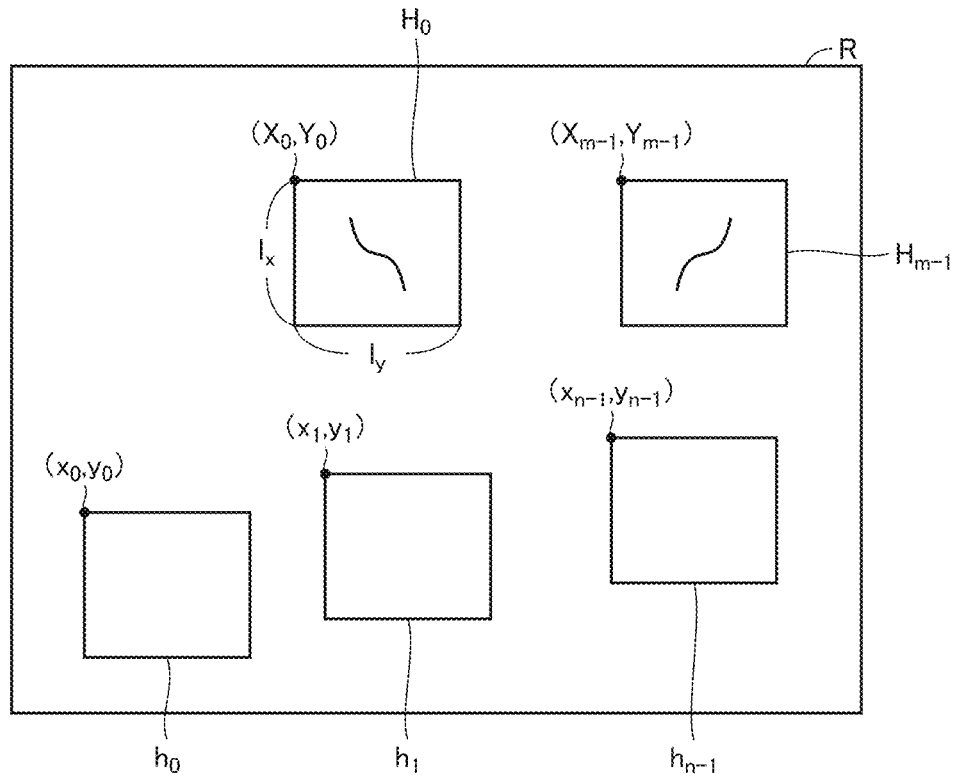
FIG. 7 is a view illustrating an example of a defect region and a background region set in an evaluation image.

FIG. 7 is a view illustrating an example of the defect region and the background region set in the evaluation image. In evaluation image R exemplified in FIG. 7, m defect regions $H_0$ to $H_{m-1}$ and n background regions $h_0$ to $h_{n-1}$ are set. m and n may be an integer greater than or equal to 1. That is, the number of defect regions set in evaluation image R is not particularly limited, and is one or greater than or equal to two. The number of background regions set in evaluation image R is not particularly limited, and is one or greater than or equal to two.

Defect regions $H_0$ to $H_{m-1}$ and background regions $h_0$ to $h_{n-1}$ in FIG. 7 have the same shape and size. Specifically, defect regions $H_0$ to $H_{m-1}$ and background regions $h_0$ to $h_{n-1}$ have a rectangular shape in which a length in the x-axis direction is 1x and a length in the y-axis direction is 1y. However, the shapes and sizes of defect regions $H_0$ to $H_{m-1}$ and background regions $h_0$ to $h_{n-1}$ may be different from each other.

The position of each pixel constituting evaluation image R is indicated by an xy-coordinate values in which an origin is the upper left corner of evaluation image R. The coordinates of an upper left vertex of defect region $H_p$ are $(X_p, Y_p)$. The coordinates of the upper left vertex of background region $h_q$ are $(x_q, y_q)$. Luminance (brightness) of the pixel in coordinates (x,y) is represented by f(x,y).

In the defect detection image measurement, the image processing emphasizing the defect portion is executed on the external appearance image, and the background is also emphasized depending on an image processing technique. Accordingly, a first algorithm depending on the difference between the defect region and the background region and a second algorithm calculating the evaluation value depending on the uniformity of the background region are previously set.

The first algorithm and the second algorithm calculate an evaluation value E expressed by the following Formula (1). That is, the minimum value among $(\sigma_0/\sigma')$ to $(\sigma_{m-1}/\sigma')$ calculated for each of defect regions $H_0$ to $H_{m-1}$ is calculated as evaluation value E.

[Mathematical Formula 1]

$$E = \min_{p=0}^{m-1}\left(\frac{\sigma_p}{\sigma'}\right) \qquad \text{Formula (1)}$$

A numerator $\sigma_p$ of Formula (1) is a value indicating a difference between defect region $H_p$ and background regions $h_0$ to $h_{n-1}$. Consequently, the first algorithm and the second algorithm can calculate evaluation value E depending on the difference between the defect region and the background region. For example, $\sigma_p$ satisfies the following

[Mathematical Formula 2]

$$\sigma_p^2 = \frac{1}{l_x l_y} \sum_{i=0}^{l_x-1} \sum_{j=0}^{l_y-1} (f(X_p + i, Y_p + j) - b)^2. \quad \text{Formula (2)}$$

In Formula (2), b represents an average value of the luminance of pixels constituting background regions $h_0$ to $h_{n-1}$, and is expressed by the following Formula (3).

[Mathematical Formula 3]

$$b = \frac{1}{nl_x l_y} \sum_{q=0}^{n-1} \sum_{i=0}^{l_x-1} \sum_{j=0}^{l_y-1} f(x_q + i, y_q + j) \quad \text{Formula (3)}$$

A denominator σ' of Formula (1) indicates the uniformity of background regions $h_0$ to $h_{n-1}$. However, in the first algorithm, a predetermined threshold value κ is substituted for σ'. For example, κ is set to 1. Thus, when the first algorithm is used, evaluation value E that does not depend on the uniformity of the background region is calculated.

In the second algorithm calculating evaluation value E depending on the uniformity of the background region, α' is calculated as follows. At this point, a method for calculating α' when a plurality of second algorithms having different contribution rates of the uniformity of the background region to evaluation value E is set will be described. The contribution ratio of the uniformity of the background region to evaluation value E is expressed by a background uniformity level λ. The background uniformity level λ can take any integer from 1 to L. For example, L is 5. For the case of L=5, five second algorithms respectively corresponding to background uniformity levels λ=1 to 5 are previously set.

First, variance V of the luminance values of all the pixels belonging to background regions $h_0$ to $h_{n-1}$ is calculated according to the following Formula (4).

[Mathematical Formula 4]

$$V = \frac{1}{nl_x l_y} \sum_{q=0}^{n-1} \sum_{i=0}^{l_x-1} \sum_{j=0}^{l_y-1} (f(x_q + i, y_q + j) - b)^2$$

$$= \frac{1}{nl_x l_y} \sum_{q=0}^{n-1} \sum_{i=0}^{l_x-1} \sum_{j=0}^{l_y-1} (f(x_q + i, y_q + j))^2 - b^2 \quad \text{Formula (4)}$$

σ' is calculated according to the following Formula (5) using variance V calculated according to Formula (4).

[Mathematical Formula 5]

$$\sigma' = \begin{cases} \kappa, & \frac{\lambda}{L}\sqrt{V} < \kappa \\ \frac{\lambda}{L}\sqrt{V}, & \frac{\lambda}{L}\sqrt{V} \geq \kappa \end{cases} \quad \text{Formula (5)}$$

As illustrated in Formula (5), when a value $(\lambda/L)V^{1/2}$ according to variance V is smaller than threshold value κ, σ' is fixed (clipped) to threshold value κ so as not to be smaller than threshold value κ. That is, when the value $(\lambda/L)V^{1/2}$ corresponding to variance V is smaller than threshold value κ, evaluation value E is calculated using threshold value κ. On the other hand, when the value $(\lambda/L)V^{1/2}$ corresponding to variance V is greater than or equal to threshold value κ, σ' is determined to be the value $(\lambda/L)V^{1/2}$ corresponding to variance V. That is, when the value $(\lambda/L)V^{1/2}$ corresponding to variance V is greater than or equal to threshold value κ, evaluation value E is calculated using $(\lambda/L)V^{1/2}$. Threshold value κ is previously set according to the second algorithm, and for example, is 1.

As described above, in the second algorithm, evaluation value E depending on variance V indicating the uniformity of the background region is calculated. Furthermore, as the background uniformity level λ increases (approaches L), denominator σ' in Formula (1) increases (contribution ratio of the uniformity of the background region to evaluation value E increases).

The luminance of the pixels constituting the evaluation image is represented by a red component, a green component, and a blue component. Processor 110 calculates $\sigma_{Rp}$ and $\sigma'_R$ by substituting the luminance of the red component into the above Formulas (2) to (5). Processor 110 calculates $\sigma_{Gp}$ and $\sigma'_G$ by substituting the luminance of the green component into the above Formulas (2) to (5). Processor 110 calculates $\sigma_{Bp}$ and $\sigma'_B$ by substituting the luminance of the blue component into the above Formulas (2) to (5). Processor 110 may substitute $\sigma_{Rp} + \sigma_{Gp} + \sigma_{Bp}$ into Formula (1) as $\sigma_p$. Similarly, processor 110 may substitute $\sigma'_R + \sigma'_G + \sigma'_B$ into Formula (1) as σ'.

Evaluation value E calculated by Formula (1) increases as the adaptation to the image measurement increases. However, the evaluation value is not limited to evaluation value E calculated according to Formula (1), but may be smaller as the adaptation to the image measurement is higher. Evaluation value E calculated by Formula (1) will be described below as an example.

F. Example of Evaluation Lighting Pattern

When the brightness of each lighting element 40 can be adjusted to seven levels (including turn-off) and when the color of each lighting element 40 can be adjusted to any one of seven colors of white, red, green, blue, cyan, magenta, and yellow, the lighting state that can be taken by each lighting element 40 is 43 ways obtained by adding the turn-off state to the turn-on state of 6×7=42 ways. When lighting device 4 includes 13 lighting elements 40, the total number of lighting patterns in which lighting device 4 can take is as huge as $43^{13}$. Consequently, in the embodiment, the lighting patterns that can be taken by lighting device 4 are previously divided into a plurality of groups, and the lighting pattern belonging to at least one group selected from the plurality of groups is determined as the evaluation lighting pattern.

Figure 8:
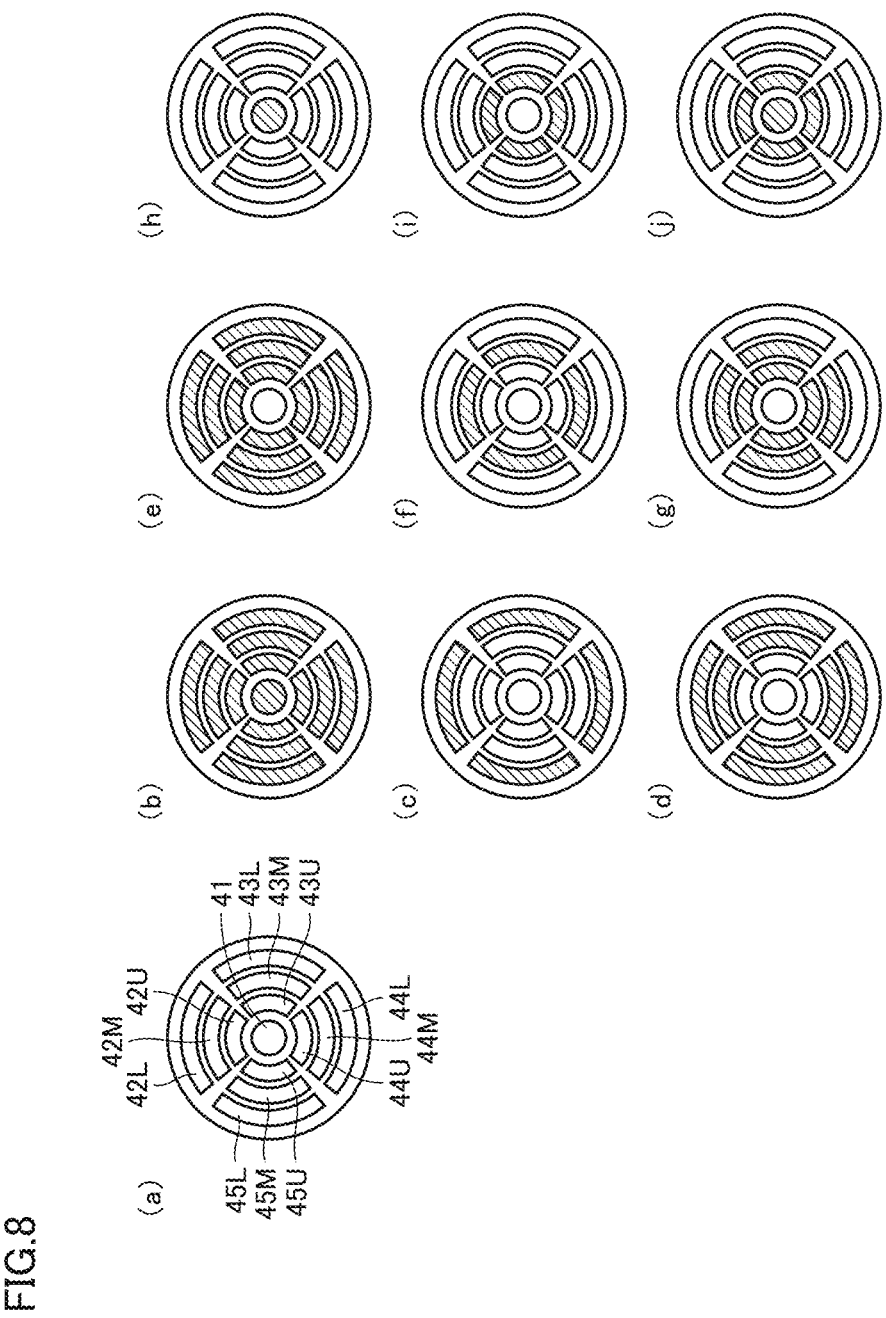
FIG. 8 is a view illustrating the lighting pattern belonging to a first group.

FIG. 8 is a view illustrating the lighting pattern belonging to the first group. The first group in FIG. 8 includes a plurality of lighting patterns in which the irradiation intensities in first radial direction D1 to fourth radial direction D4 are uniform.

As illustrated in FIG. 8, nine types of (b) to (j) exist in the first group as the combination (hereinafter, referred to as an "element combination") of lighting elements 40 to be turned on. In the element combination illustrated in (b), all lighting elements 40 are turned on. In the element combination illustrated in (c), lighting elements 42L to 45L having a distance r3 from lighting element 41 (see FIG. 4) are turned on. In the element combination illustrated in (d), lighting elements 42M to 45M, 42L to 45L having distances r2, r3 (see FIG. 4) from lighting element 41 are turned on. In the element combination illustrated in (e), lighting elements 40 other than central lighting element 41 are turned on. In the element combination illustrated in (f), lighting elements 42M to 45M having distance r2 from lighting element 41 (see FIG. 4) are turned on. In the element combination illustrated in (g), lighting elements 42U to 45U, 42M to 45M having distances r1, r2 (see FIG. 4) from lighting element 41 are turned on. In the element combination illustrated in (h), only central lighting element 41 is turned on. In the element combination illustrated in (i), lighting elements 42U to 45U having distance r1 from lighting element 41 (see FIG. 4) are turned on. In the element combination illustrated in (j), lighting elements 41, 42U to 45U are turned on. The brightness and color of the lighting elements to be turned on are all adjusted to be the same.

Figure 9:
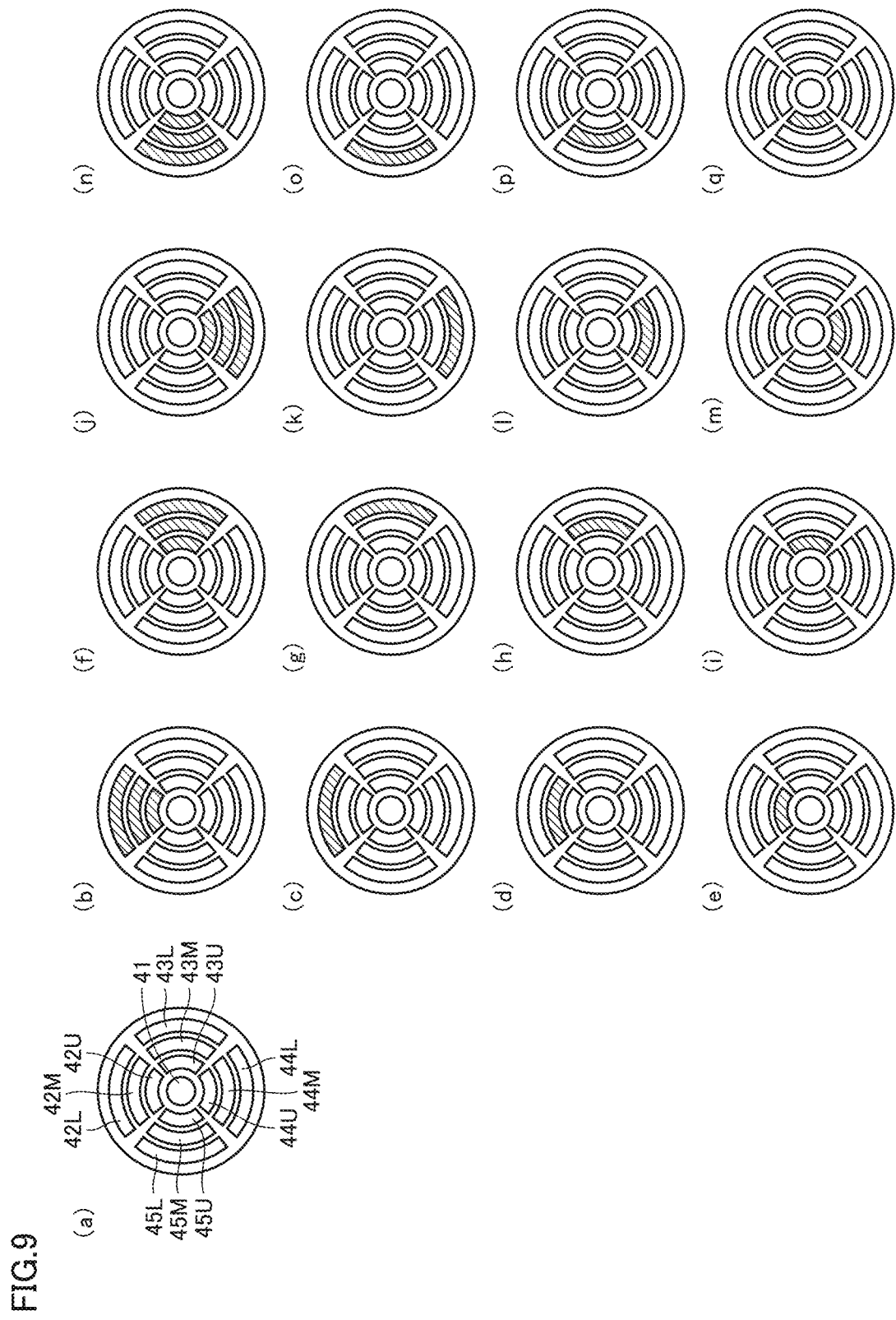
FIG. 9 is a view illustrating the lighting pattern belonging to a second group.

FIG. 9 is a view illustrating the lighting pattern belonging to the second group. The second group in FIG. 9 includes the plurality of lighting patterns in which only the lighting elements arranged in one of first radial direction D1 to fourth radial direction D4 are turned on.

As illustrated in FIG. 9, the second group includes 16 types of element combinations (b) to (q). All of lighting elements 42L, 42M, 42U arranged in first radial direction D1 (see FIG. 4) are turned on in the element combination illustrated in (b), and each of lighting elements 42L, 42M, 42U is turned on in the element combinations illustrated in (c) to (e). All of lighting elements 43L, 43M, 43U arranged in second radial direction D2 (see FIG. 4) are turned on in the element combination illustrated in (f), and each of lighting elements 43L, 43M, 43U is turned on in the element combinations illustrated in (g) to (i). All of lighting elements 44L, 44M, 44U arranged in third radial direction D3 (see FIG. 4) are turned on in the element combination illustrated in (j), and each of lighting elements 44L, 44M, 44U is turned on in the element combinations illustrated in (k) to (m). All of lighting elements 45L, 45M, 45U arranged in fourth radial direction D4 (see FIG. 4) are turned on in the element combination illustrated in (n), and each of lighting elements 45L, 45M, 45U is turned on in the element combinations illustrated in (o) to (q). The brightness and color of the lighting elements to be turned on are all adjusted to be the same.

Figure 10:
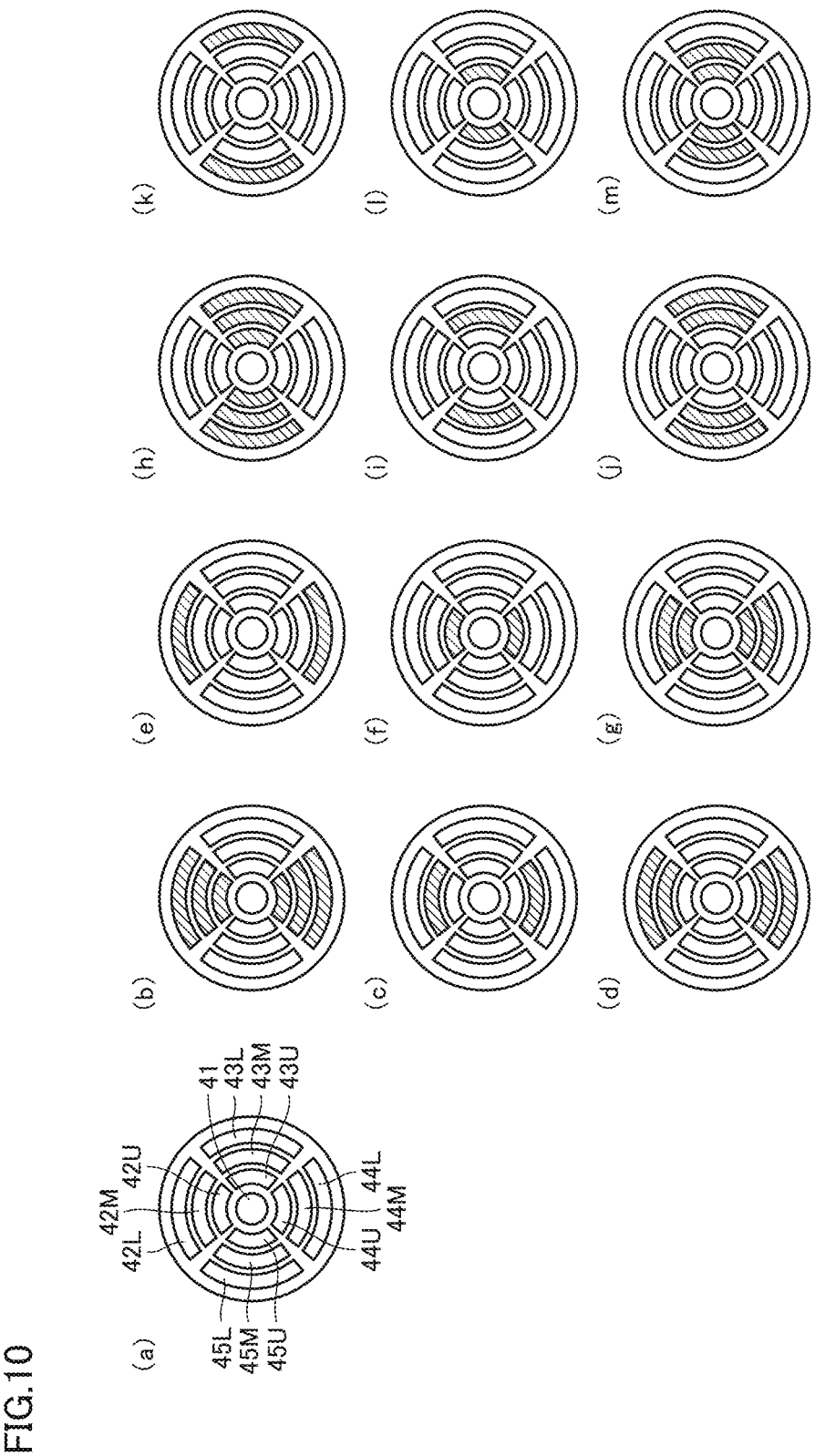
FIG. 10 is a view illustrating the lighting pattern belonging to a third group.

FIG. 10 is a view illustrating the lighting pattern belonging to the third group. The third group in FIG. 10 includes the plurality of lighting patterns in which only lighting elements arranged along a pair of radial directions opposite to each other in first radial direction D1 to fourth radial direction D4 are turned on.

As illustrated in FIG. 10, the third group includes 12 types of element combinations (b) to (m). Specifically, in the element combinations illustrated in (b) to (g), the selected lighting elements among lighting elements 42L, 42M, 42U arranged in first radial direction D1 (see FIG. 4) and lighting elements 44L, 44M, 44U arranged in third radial direction D3 are turned on. The lighting element to be turned on among lighting elements 44L, 44M, 44U is symmetrical to the lighting element to be turned on among lighting elements 42L, 42M, 42U with respect to central lighting element 41. In the element combinations illustrated in (h) to (m), the selected lighting elements among lighting elements 43L, 43M, 43U arranged in second radial direction D2 (see FIG. 4) and lighting elements 45L, 45M, 45U arranged in fourth radial direction D4 are turned on. The lighting element to be turned on among lighting elements 43L, 43M, 43U, is symmetrical to lighting element to be turned on among lighting elements 45L, 45M, 45U with respect to central lighting element 41. The brightness and color of the lighting elements to be turned on are all adjusted to be the same.

When the plurality of lighting elements 40 are radially arranged along the first to Nth radial directions at equal angular intervals, the third group in which only the lighting elements arranged along the pair of radial directions opposite to each other are turned on can be set as long as N is an even number greater than or equal to four. The second group in which only one radially arranged lighting element is turned on can be set as long as N is an integer greater than or equal to two.

G. Setting Screen for Optimization of Lighting Pattern

Figure 11:
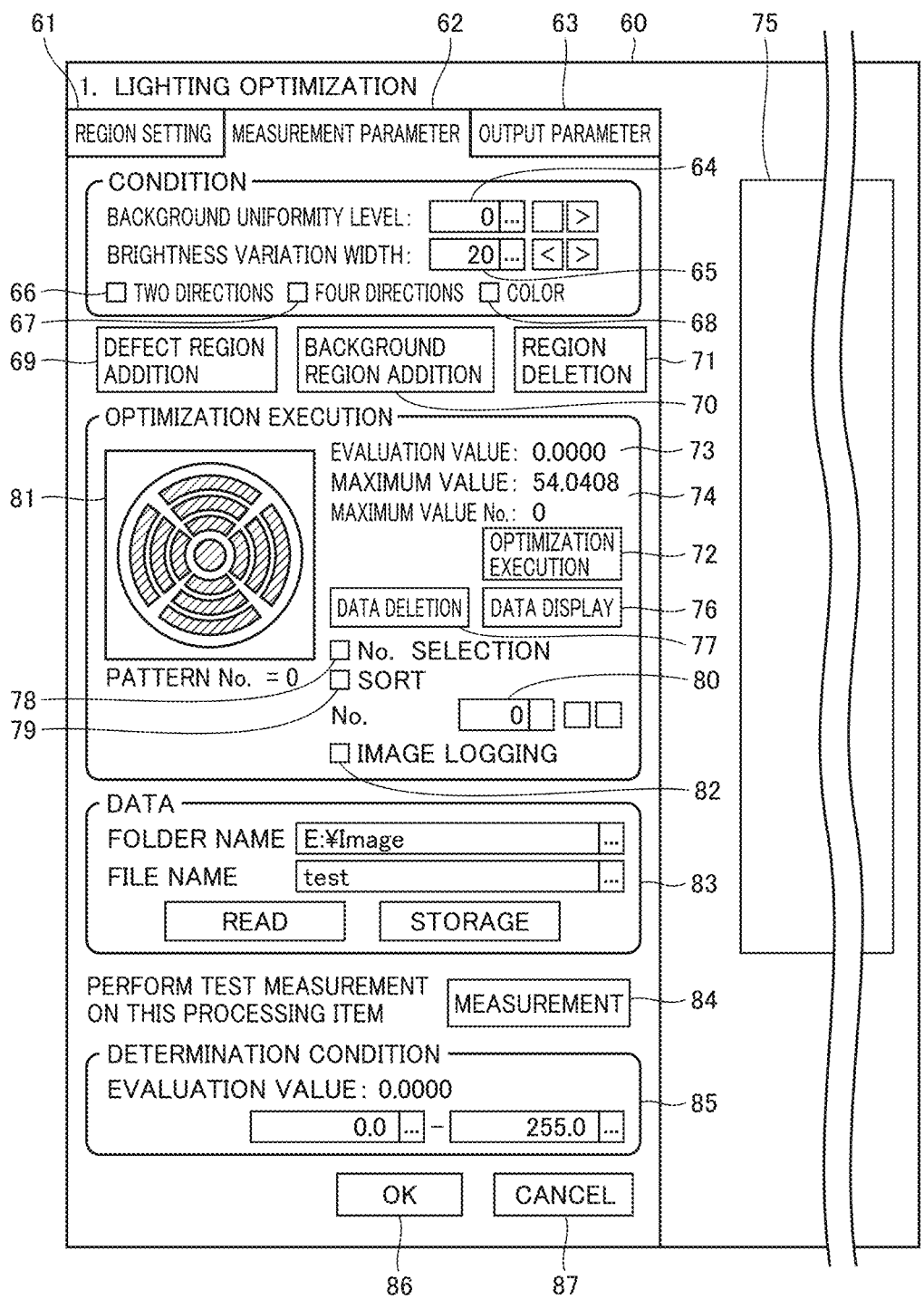
FIG. 11 is a view illustrating an example of a setting screen optimizing the lighting pattern.

With reference to FIG. 11, an example of the setting screen optimizing the lighting pattern will be described. FIG. 11 is a view illustrating an example of the setting screen optimizing the lighting pattern.

A setting screen 60 in FIG. 11 is displayed on display 101 by processor 110 executing control program 150. The input to setting screen 60 is executed using touch panel 102. That is, processor 110 executes processing according to the input to touch panel 102 that is a user interface.

Setting screen 60 in FIG. 11 includes three tabs 61 to 63. Tab 61 is selected when the defect region is set. Tab 62 is selected when various measurement parameters for optimization are set. Tab 63 is selected when an output condition of information indicating the measurement lighting pattern determined by the optimization is set. FIG. 11 illustrates setting screen 60 when tab 62 is selected.

Setting screen 60 includes an input field 64 in which an evaluation algorithm is selected. One of integers from 0 to L can be input to input field 64. At this point, "0" is input when the first algorithm is selected. The integer of any one of 1 to L is input when the second algorithm is selected. "1" to "L" input to input field 64 indicate the background uniformity level λ. Processor 110 selects the target algorithm from the first algorithm and the L types of second algorithms according to the input to input field 64.

Setting screen 60 includes an input field 65 and check boxes 66 to 68 in which the evaluation lighting pattern is selected among the lighting patterns that can be taken by lighting device 4.

Check boxes 66, 67 are boxes in which one of the first to third groups in FIGS. 8 to 10 is selected. When neither of check boxes 66, 67 is checked, the first group in FIG. 8 is selected. When check box 66 is checked while check box 67 is not checked, the first group in FIG. 8 and the third group in FIG. 10 are selected. When check box 66 is not checked while check box 67 is checked, the first group in FIG. 8 and the second group in FIG. 9 are selected. When both check boxes 66, 67 are checked, all of the first to third groups are selected.

Check box 68 is used to set the emission color of lighting element 40 to be turned on. When check box 68 is not checked, the emission color of lighting element 40 to be turned on is set to only white. When check box 68 is checked, the emission color of lighting element 40 to be turned on is adjusted to six colors of red, green, blue, cyan, magenta, and yellow other than white.

Input field 65 is used to set a variation width of the brightness of lighting element 40 to be turned on. For example, when the brightness of each lighting element 40 is adjustable in 127 steps and when "20" is input in input field 65, the brightness of lighting element 40 to be turned on is adjusted in 6 steps of "20", "40", "60", "80", "100", and "120". When "30" is input in input field 65, the brightness of lighting element 40 to be turned on is adjusted in four stages of "30", "60", "90", and "120".

For example, when check boxes 66 to 68 are not checked and when "20" is input to input field 65, the brightness is sequentially adjusted to six levels for each of the nine types of element combinations (b) to (j) in FIG. 8. Consequently, processor 110 selects the lighting patterns of 9×6=54 as the evaluation lighting pattern.

When only check box 66 is checked and when "20" is input to input field 65, the brightness is sequentially adjusted to six levels for each of the 9 types of element combinations of (b) to (j) in FIG. 8 and the 12 types of element combinations of (b) to (m) in FIG. 10. Consequently, processor 110 selects the lighting patterns of 21×6=126 as the evaluation lighting pattern.

When only check box 68 is checked and when "20" is input to input field 65, for each of the nine types of element combinations of (b) to (j) in FIG. 8, the brightness is sequentially adjusted to six levels of brightness and six types of emission colors are sequentially adjusted. Consequently, processor 110 selects the lighting patterns of 9×6×6=324 as the evaluation lighting pattern.

Setting screen 60 includes a button 69 adding the defect region, a button 70 adding the background region, and a button 71 deleting the defect region or the background region. Details of processing of processor 110 when buttons 69 to 71 are operated will be described later.

Setting screen 60 includes a button 72 starting processing of determining a measurement lighting pattern optimal for the image measurement from the evaluation lighting patterns. When button 72 is operated, processor 110 causes lighting device 4 to emit the illumination light according to each of the plurality of evaluation lighting patterns determined according to the operation of input field 65 and check boxes 66 to 68, and acquires the evaluation image corresponding to each evaluation lighting pattern from camera 8. Processor 110 calculates evaluation value E for each evaluation lighting pattern using the acquired evaluation image and the target algorithm selected according to the input to input field 64.

Processor 110 calculates evaluation value E each time the evaluation image is acquired, and displays calculated evaluation value E in a display field 73. When the calculation of evaluation values E for all the evaluation lighting patterns is ended, processor 110 displays maximum evaluation value E and a lighting pattern number identifying the evaluation lighting pattern in which maximum evaluation value E is calculated in a display field 74.

Processor 110 repeats the calculation of evaluation value E each time button 72 is operated. Thus, a plurality of evaluation values E are obtained for the same sample or different samples.

Setting screen 60 includes a button 76 switching the display content of a region 75. Either the evaluation image acquired from camera 8 or a list of evaluation values E calculated by processor 110 is displayed in region 75. When button 76 is operated while the evaluation image is displayed, processor 110 switches the display content of region 75 to the list of evaluation values E. When button 76 is operated while the list of evaluation values E is displayed, processor 110 switches the display content of region 75 to the evaluation image.

Setting screen 60 includes a button 77 deleting unnecessary data. Processor 110 deletes data designated in the list of evaluation values E displayed in region 75.

Setting screen 60 includes check boxes 78, 79 selecting one of the plurality of evaluation lighting patterns and an input field 80. When one of check boxes 78, 79 is checked, processor 110 receives the input to input field 80. Processor 110 sorts the list of evaluation values E displayed in region 75 in order of the magnitude of evaluation value E in response to the check of check box 79.

Processor 110 displays the evaluation image corresponding to the evaluation lighting pattern of the lighting pattern number input to input field 80 in region 75. Furthermore, processor 110 displays a schematic view illustrating the position of lighting element 40 to be turned on in the evaluation lighting pattern of the lighting pattern number input to input field 80 in a region 81. Furthermore, processor 110 displays evaluation value E calculated for the evaluation lighting pattern of the lighting pattern number input to input field 80 in display field 73. Thus, the user can easily check evaluation value E, the evaluation image, and the position of lighting element 40 to be turned on corresponding to each evaluation lighting pattern.

Setting screen 60 includes a check box 82 performing logging of the evaluation image. When check box 82 is checked, processor 110 stores the acquired evaluation image in a storage area.

Setting screen 60 includes a region 83 executing storage of data of calculated evaluation value E. A storage folder and a storage file name are specified in region 83. When finishing the calculation of evaluation value E for each evaluation lighting pattern according to the operation of button 72, processor 110 generates evaluation value data indicating the list of calculated evaluation values E. Processor 110 assigns the file name designated in region 83 to the generated evaluation value data, and stores the evaluation value data in the folder designated in region 83. Details of the evaluation value data will be described later.

When check box 82 is checked, the evaluation image is also stored in the storage folder designated in region 83.

Further, setting screen 60 includes a button 84 performing test measurement and a region 85 inputting a determination condition. Processor 110 issues an error notification when evaluation value E does not satisfy the determination condition input to region 85. When the error notification is unnecessary, the entire range that can be taken by evaluation value E may be set to region 85.

Setting screen 60 includes an OK button 86 and a cancel button 87. In response to the operation of OK button 86, processor 110 determines the evaluation lighting pattern corresponding to evaluation value E (maximum evaluation value) having the highest adaptation as the measurement lighting pattern. In response to the operation of cancel button 87, processor 110 ends the processing without reflecting the result of the operation on setting screen 60 in the setting of lighting device 4.

H. Setting of Defect Region and Background Region

Figure 12:
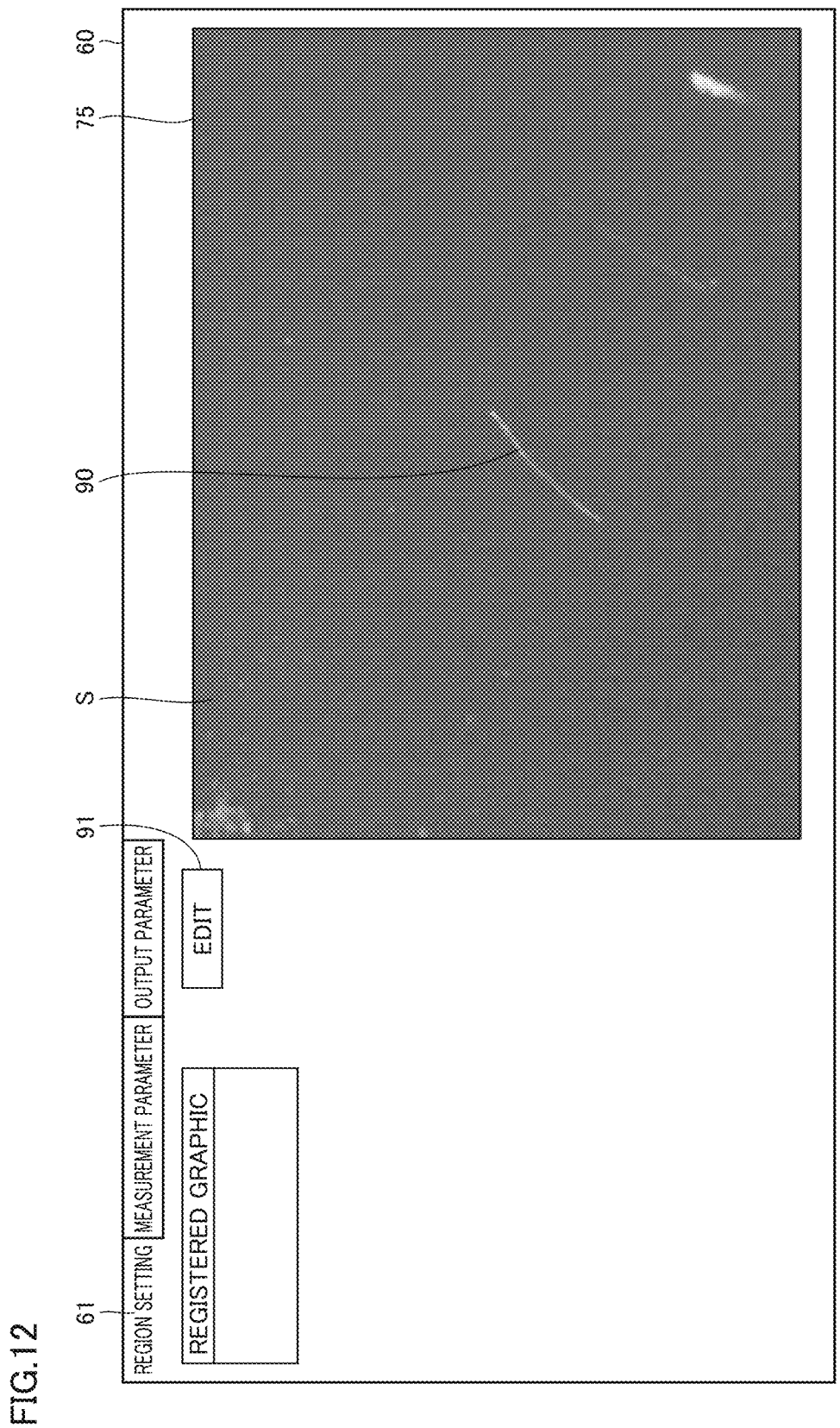
FIG. 12 is a view illustrating an example of the setting screen when a tab 61 setting the defect region is operated.

With reference to FIGS. 12 to 16, a method for setting the defect region and the background region will be described below. FIG. 12 is a view illustrating an example of the setting screen when tab 61 setting the defect region is operated.

As illustrated in FIG. 12, when tab 61 is operated, processor 110 displays the sample image acquired from camera 8 in region 75 of setting screen 60. The user installs the sample of target W before operating tab 61. Thus, a sample image S corresponding to the sample is displayed in region 75 of setting screen 60. Sample image S in FIG. 12 has a defect portion 90.

Setting screen 60 includes an edit button 91 editing the defect region. When edit button 91 is operated, processor 110 starts the edition of the defect region.

Figure 13:
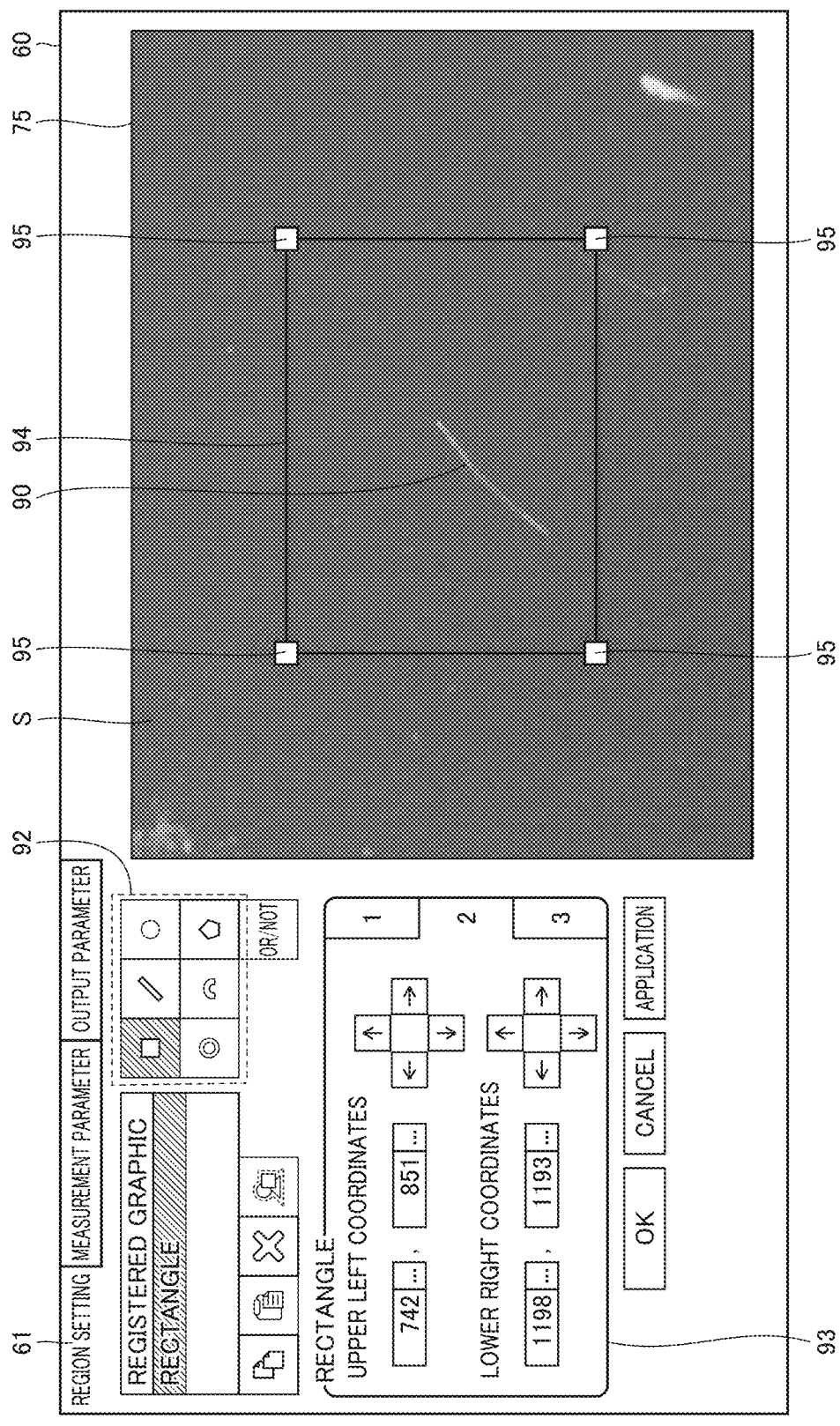
FIG. 13 is a view illustrating an example of the setting screen when an edit button in FIG. 12 is operated.

FIG. 13 is a view illustrating an example of the setting screen when the edit button in FIG. 12 is operated. Setting screen 60 in FIG. 13 includes a region shape selection button group 92 and a size editing region 93. When a button included in region shape selection button group 92 is operated, processor 110 displays a frame line 94 having a shape (quadrangle, circle, fan, and the like) corresponding to the button so as to be superimposed on sample image S. Frame line 94 indicates the range of the defect region.

Furthermore, in response to the operation on a button and/or an input box included in size editing region 93, processor 110 edits the position and size of frame line 94. Processor 110 may display a change button 95 changing the position or size of frame line 94, and change the position and size of frame line 94 according to the operation on change button 95.

Figure 14:
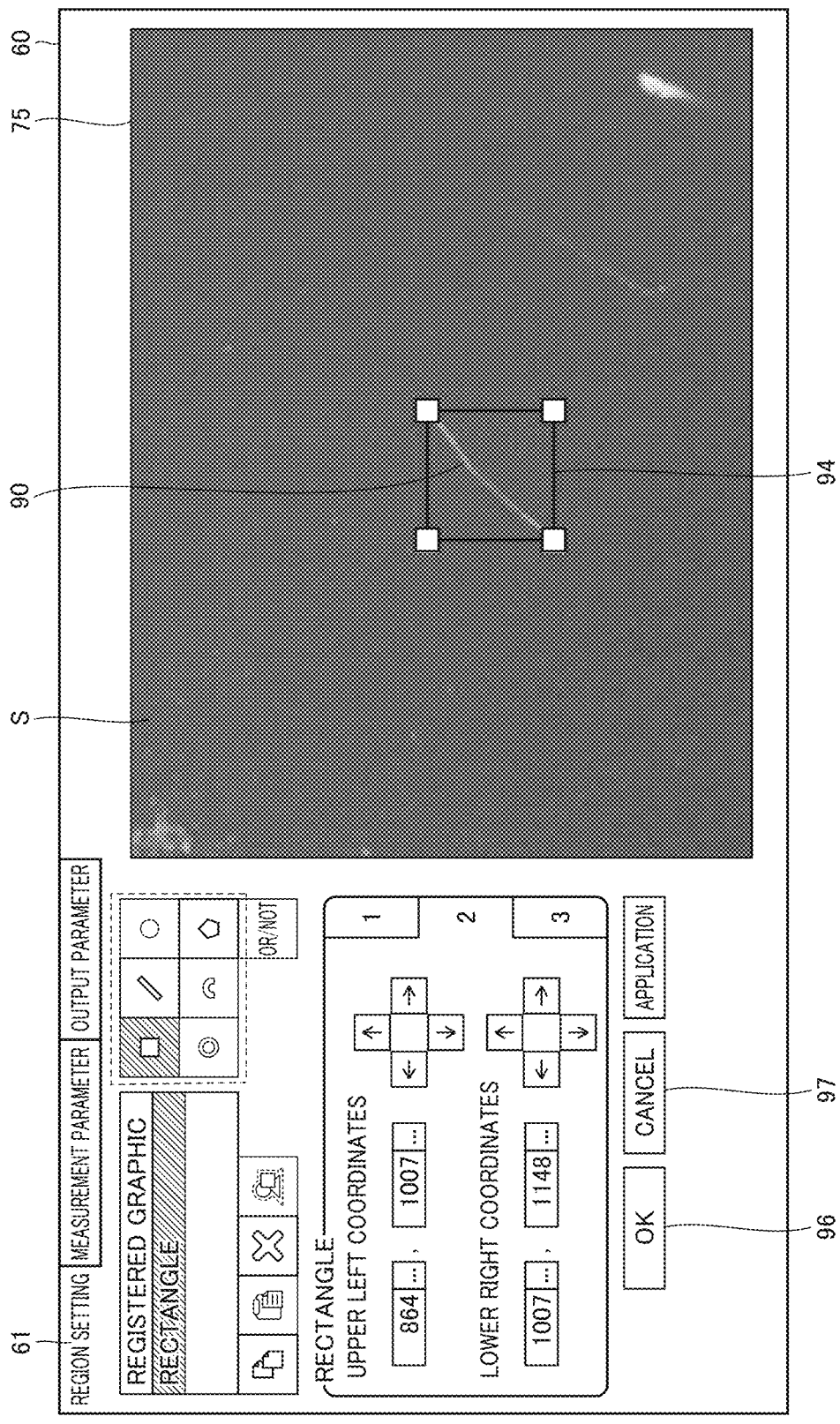
FIG. 14 is a view illustrating an example of the setting screen after a position and a size of a frame line indicating a range of the defect region are changed.

FIG. 14 is a view illustrating an example of the setting screen after the position and the size of the frame line indicating a range of the defect region are changed. As illustrated in FIG. 14, the user adjusts the position and size of frame line 94 such that defect portion 90 falls into frame line 94.

When an OK button 96 is operated, processor 110 sets the region surrounded by frame line 94 as the defect region. On the other hand, when a cancel button 97 is operated, processor 110 deletes the data being edited.

Figure 15:
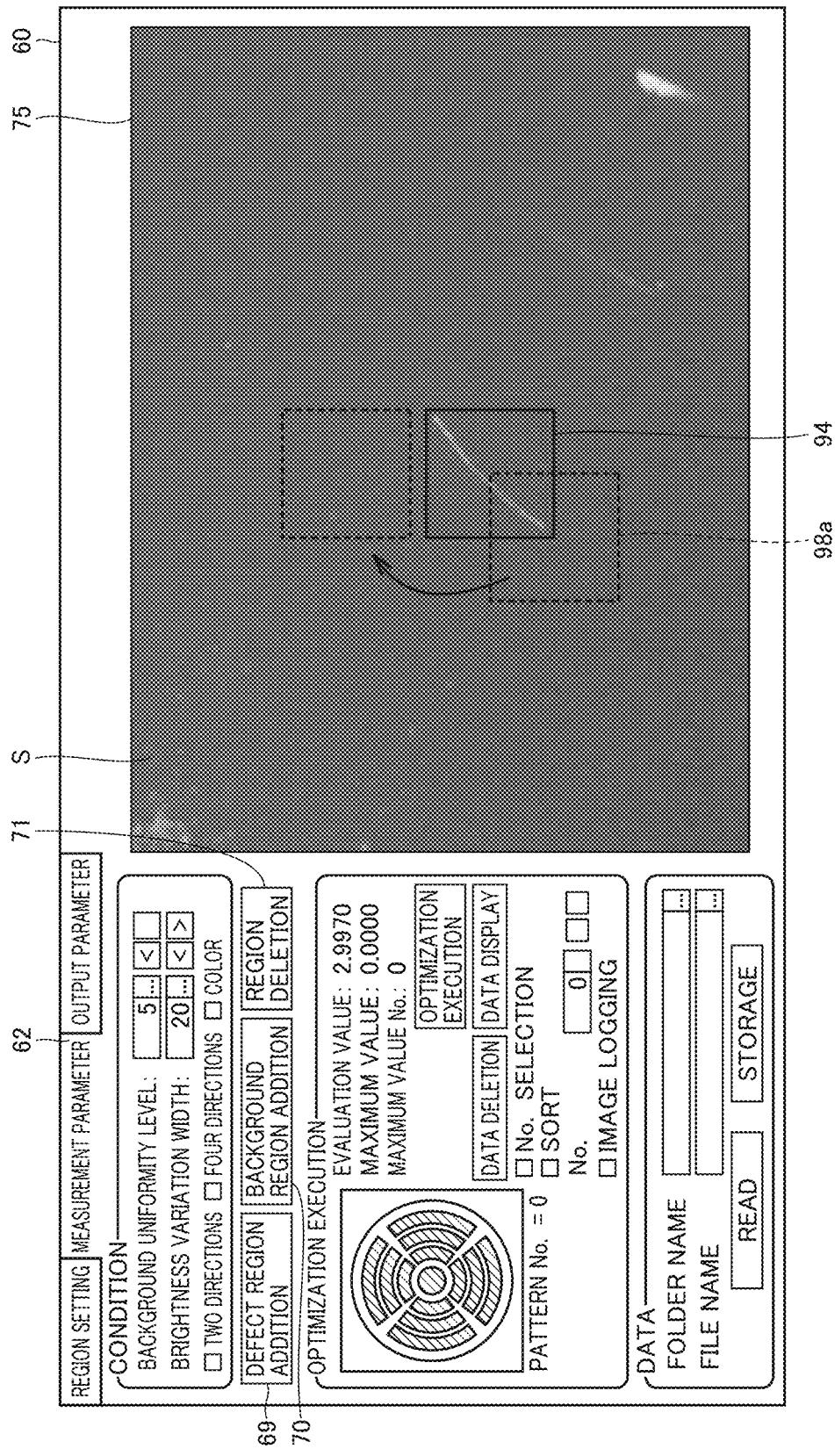
FIG. 15 is a view illustrating an example of the setting screen when the background region is set.

FIG. 15 is a view illustrating an example of the setting screen when the background region is set. Setting screen 60 in FIG. 15 is displayed in response to the operation of tab 62 after the setting of the defect region. When button 70 adding the background region is operated, processor 110 displays a frame line 98a having the same shape and size as frame line 94 indicating the range of the set defect region while superimposing frame line 98a on sample image S. Frame line 98a indicates a range of one background region. Processor 110 receives a drag operation on frame line 98a, and moves frame line 98a according to the drag operation. The user may move frame line 98a such that frame line 98a does not include the defect portion. Processor 110 sets the region surrounded by frame line 98a as the background region. In this manner, the user can set the background region only by appropriately setting the position of frame line 98a.

Figure 16:
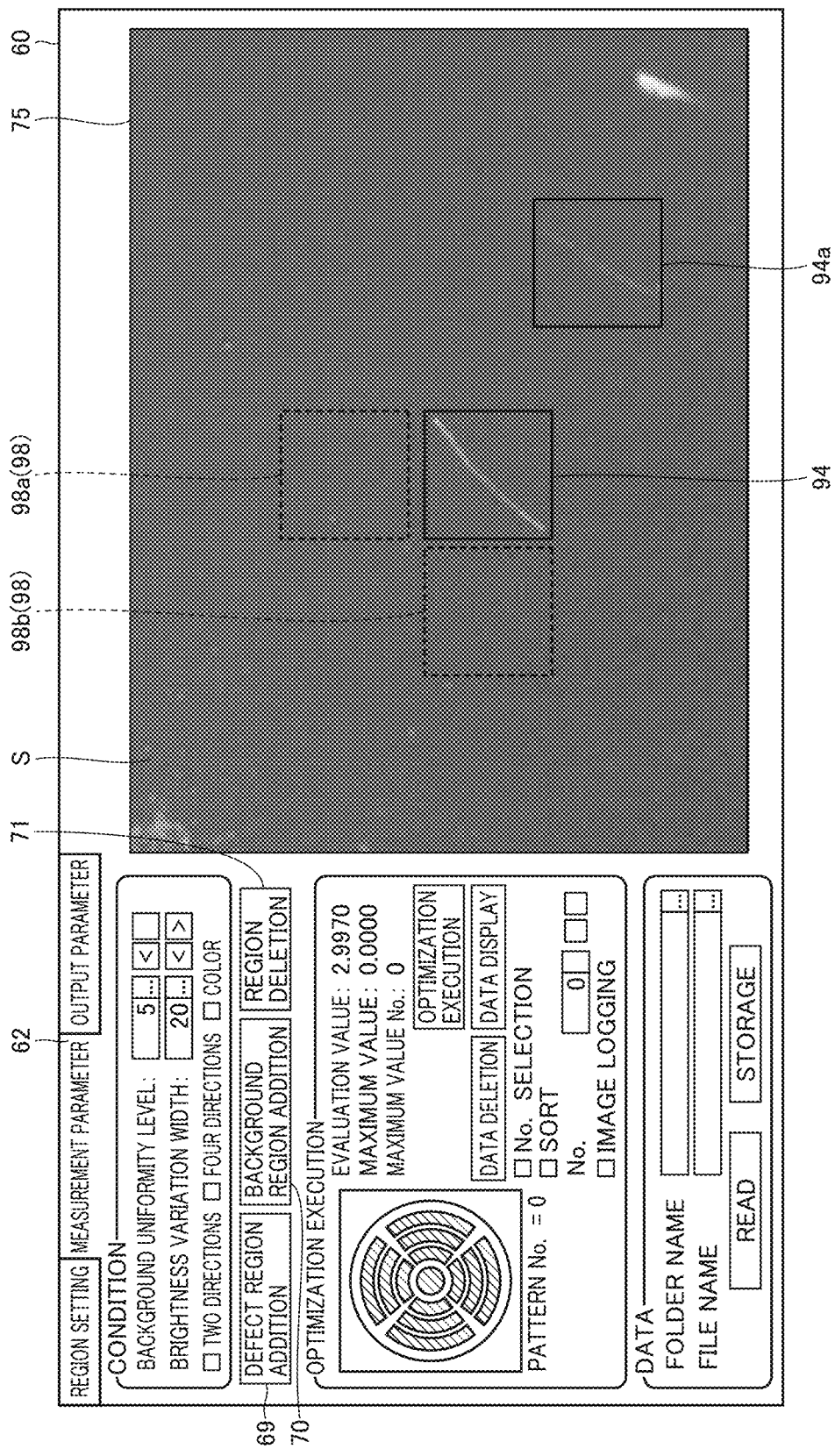
FIG. 16 is a view illustrating another example of the setting screen when an additional background region and an additional defect region are set.

FIG. 16 is a view illustrating another example of the setting screen when an additional background region and an additional defect region are set. Frame lines 98a, 98b setting the background region are displayed on setting screen 60 in FIG. 16. Every time button 70 is operated, processor 110 displays frame line 98 setting the background region while superimposing frame line 98 on sample image S, and sets the region surrounded by each frame line 98 (98a, 98b) as the background region. Depending on sample image S, the brightness, the contrast, and the like may change according to the position. Thus, the user sets a plurality of background regions arranged at different positions.

When sample image S includes a plurality of defect portions, the user may operate button 69 adding the defect region. In response to the operation of button 69, processor 110 displays a frame line 94a having the same shape and size as frame line 94 indicating the range of the set defect region while superimposing frame line 94a on sample image S. The user changes the position and size of frame line 94a. Processor 110 sets the range surrounded by frame line 94a as a range of a new defect region.

Furthermore, when a button 71 is operated while any one of frame lines 94a, 98a, 98b is selected, processor 110 deletes the selected frame line. Thus, the user can delete the unnecessary frame line.

I. Evaluation Value Data

FIG. 17 is a view illustrating an example of the evaluation value data. As illustrated in FIG. 17, the evaluation value data is data in which the lighting pattern number identifying the evaluation lighting pattern, detailed information about the evaluation lighting pattern, and evaluation value E are associated for each evaluation lighting pattern. The detailed information indicates the lighting element to be turned on, the brightness of the lighting element, and the emission color of the lighting element. As described above, when a button 72 (see FIG. 11) of setting screen 60 is operated a plurality of times, the evaluation image is acquired each time the button is operated, and evaluation value E is calculated for the acquired evaluation image. Accordingly, the evaluation value data indicates evaluation value E of each time.

When a button 76 is operated on setting screen 60 in FIG. 11, processor 110 displays the list of evaluation values E in region 75 of setting screen 60 based on the evaluation value data.

Figure 18:
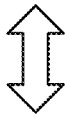
FIG. 18 is a view illustrating a list of evaluation values displayed on the setting screen.

FIG. 18 is a view illustrating the list of evaluation values displayed on the setting screen. (a) of FIG. 18 illustrates the list of evaluation values E when check box 79 is not checked on setting screen 60 in FIG. 11, and (b) of FIG. 18 illustrates the list of evaluation values E when check box 79 is checked. FIG. 18 illustrates the list of eight evaluation values E ("Data 0" to "Data 7") calculated according to eight operations to button 72 (see FIG. 11) on setting screen 60. "P-No." indicates the lighting pattern number identifying the evaluation lighting pattern.

As illustrated in (a) of FIG. 18, evaluation value E is displayed in the order of the lighting pattern number. Thus, the user can grasp the adaptation of each evaluation lighting pattern to the image measurement. By checking check box 79, the user can sort evaluation values E in descending order as illustrated in FIG. 18(b). Thus, the evaluation lighting pattern having the high adaptation to image measurement can be easily specified.

When the evaluation value data includes the plurality of evaluation values E for each evaluation lighting pattern, processor 110 performs the sorting according to the following procedure. Processor 110 extracts the evaluation value (minimum evaluation value) having the lowest adaptation to the image measurement from among the plurality of evaluation values E for each evaluation lighting pattern. Processor 110 rearranges the lighting pattern numbers and the evaluation values in descending order of the adaptation to the image measurement based on the extracted minimum evaluation value. That is, processor 110 rearranges the lighting pattern numbers and the evaluation values in descending order of the minimum evaluation value.

That is, when acquiring the plurality of evaluation images for each evaluation lighting pattern, processor 110 calculates evaluation value E for each of the plurality of evaluation images. Then, processor 110 extracts the evaluation value (hereinafter, referred to as a "lowest evaluation value") having the lowest adaptation from the evaluation values E for the plurality of evaluation images for each evaluation lighting pattern. Processor 110 determines the evaluation lighting pattern in which the lowest evaluation value having the highest adaptation is extracted from the plurality of evaluation lighting patterns as the measurement lighting pattern.

J. Processing Example of Optimization of Lighting Pattern

Figure 19:
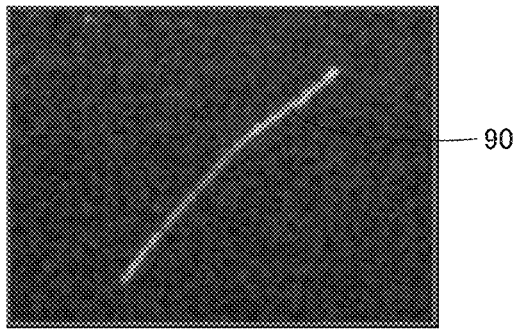
FIG. 19 is an enlarged view illustrating a part of four evaluation images obtained under lighting of four evaluation lighting patterns having different brightness.
Figure 19:
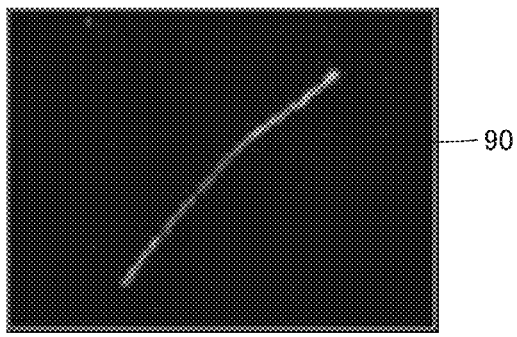
Figure 19:
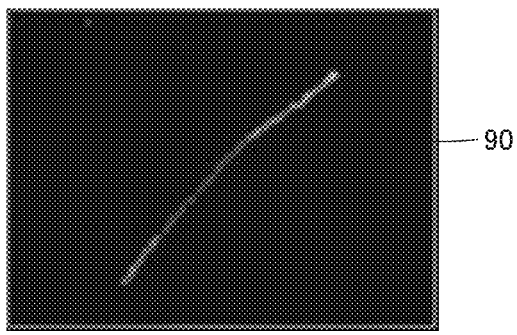
Figure 19:
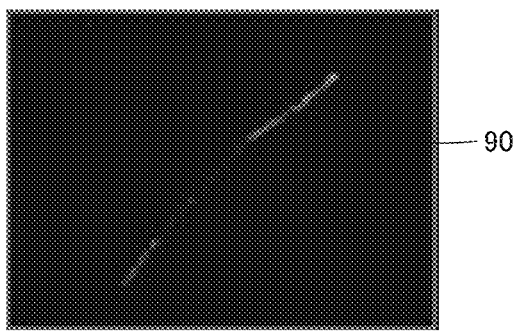

With reference to FIGS. 19 to 22, a processing example of optimization of the lighting pattern will be described below. FIG. 19 is an enlarged view illustrating a part of four evaluation images obtained under the lighting of four evaluation lighting patterns having different brightness. (a) to (d) of FIG. 19 illustrate the evaluation images corresponding to lighting pattern Nos. 29, 7, 44, and 40, respectively. (a) of FIG. 19 illustrates a relatively dark evaluation image with a low background uniformity. On the other hand, the brightness increases in the order of (b) to (d) of FIG. 19, and the uniformity of the background increases. However, as the uniformity of the background increases, the difference between defect portion 90 and the background decreases.

FIG. 20 is a view illustrating the value of σ' calculated from the evaluation image in FIG. 19. FIG. 20 illustrates the value of σ' when threshold value κ is set to 1. In FIG. 20, "λ=0" indicates the first algorithm calculating the evaluation value that depends on the difference between the defect region and the background region and does not depend on the uniformity of the background region. That is, σ' is fixed to threshold value κ (=1) for all the evaluation lighting patterns. On the other hand, "λ=1" to "λ=5" indicate the second algorithms when the background uniformity level λ, is set to 1 to 5.

σ' corresponding to the lighting pattern No. 29 takes a value larger than threshold value κ (=1) even when the background uniformity level λ is set to 1 because the uniformity of the background in the evaluation image is low (see (a) of FIG. 19), and α' corresponding to the lighting pattern No. 29 increases as the background uniformity level λ increases.

The uniformity of the background in the evaluation image corresponding to the lighting pattern Nos. 7, 44 is higher than the uniformity of the background in the evaluation image corresponding to the lighting pattern No. 29 (see (b) and (c) of FIG. 19). Consequently, a' corresponding to the lighting pattern Nos. 7, 44 is fixed to threshold value κ (=1) at the background uniformity level λ=1, 2, and takes a value larger than threshold value κ when the background uniformity level λ is at least 3. The uniformity of the background in the evaluation image corresponding to lighting pattern No. 44 is higher than the uniformity of the background in the evaluation image corresponding to the lighting pattern No. 7. Consequently, when the background uniformity level λ is 3 or more, σ' corresponding to the lighting pattern No. 44 is smaller than σ' corresponding to the lighting pattern No. 7.

The uniformity of the background in the evaluation image corresponding to lighting pattern No. 40 is higher than the uniformity of the background in the evaluation image corresponding to lighting pattern No. 44 (see (d) of FIG. 19). Consequently, α' corresponding to lighting pattern No. 40 is fixed to threshold value κ (=1) at all background uniformity levels λ.

FIG. 21 is a view illustrating evaluation value E calculated from the evaluation image in FIG. 19. FIG. 21 illustrates evaluation value E when threshold value x is set to 1.

When the first algorithm (λ=0) is selected as the target algorithm, evaluation value E corresponding to the lighting pattern No. 29 is maximized, and the lighting pattern No. 29 is determined as the measurement lighting pattern. As illustrated in FIG. 20, α' depending on the uniformity of the background is fixed to threshold value κ (=1) for all the evaluation lighting patterns. Consequently, evaluation value E depends only on $\sigma_p$ of the numerator according to the above Formula (1). $\sigma_p$ is a value indicating the difference between the defect region and the background region. Accordingly, evaluation value E corresponding to the lighting pattern No. 29 in which the evaluation image having the large difference between the defect portion and the background is obtained is maximized.

When the second algorithm of the background uniformity level λ=1, 2 is selected as the target algorithm, evaluation value E corresponding to the lighting pattern No. 7 is maximized, and the lighting pattern No. 7 is determined as the measurement lighting pattern. As illustrated in FIG. 20, σ' corresponding to the lighting pattern No. 29 is larger than threshold value κ (=1) at background uniformity levels λ=1, 2. σ' is a denominator of the above Formula (1). Consequently, evaluation value E corresponding to the lighting pattern No. 29 becomes small, and evaluation value E corresponding to the lighting pattern No. 7 in which $\sigma_p$ indicating the difference between the defect region and the background region is the next largest becomes maximum.

When the second algorithm of the background uniformity level λ=3, 4 is selected as the target algorithm, evaluation value E corresponding to the lighting pattern No. 44 is maximized, and the lighting pattern No. 44 is determined as the measurement lighting pattern. As illustrated in FIG. 20, σ' corresponding to the lighting pattern No. 7 is larger than threshold value κ (=1) at background uniformity levels λ=3, 4. Consequently, evaluation value E corresponding to the lighting pattern No. 7 decreases. σ' corresponding to the lighting pattern No. 44 having the next largest $\sigma_p$ is also larger than threshold value κ (=1), but smaller than σ' corresponding to the lighting pattern No. 7. Consequently, evaluation value E corresponding to the lighting pattern No. 44 is maximized.

When the second evaluation algorithm of the background uniformity level λ=5 is selected as the target algorithm, evaluation value E corresponding to the lighting pattern No. 40 is maximized, and the lighting pattern No. 40 is determined as the measurement lighting pattern. As illustrated in FIG. 20, at the background uniformity level λ=5, only σ' corresponding to the lighting pattern No. 40 is fixed to threshold value κ (=1), and σ' corresponding to another evaluation lighting pattern is considerably larger than threshold value κ (=1). Consequently, evaluation value E corresponding to the lighting pattern No. 40 is maximized.

As described above, the evaluation lighting pattern in which maximum evaluation value E is maximized is different according to the selected target algorithm. Consequently, the lighting pattern suitable for the image measurement can be determined as the measurement lighting pattern by selecting the evaluation algorithm according to the image measurement.

Figure 22:
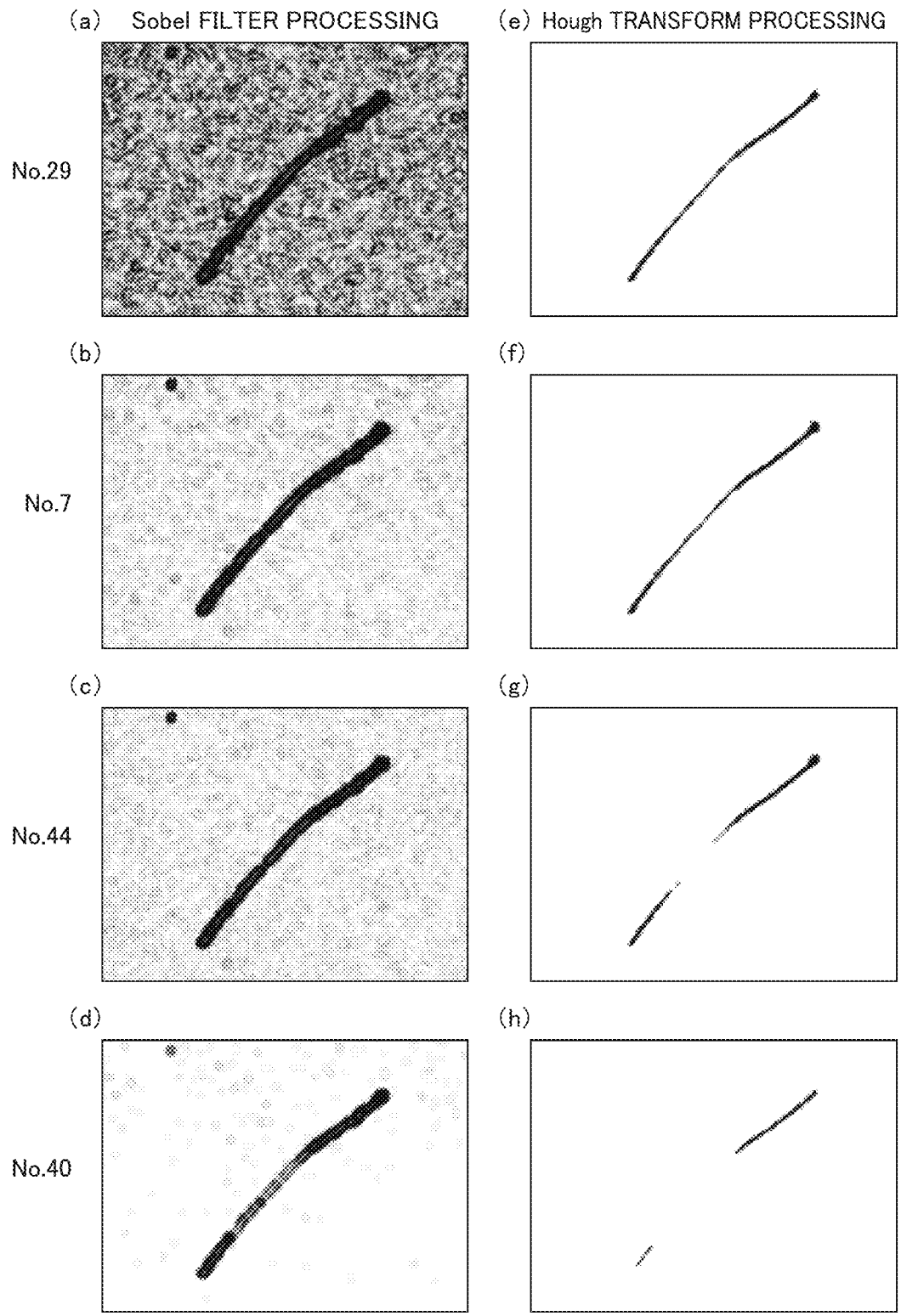
FIG. 22 is a view illustrating a result of image processing performed on the evaluation image in FIG. 19.

FIG. 22 is a view illustrating a result of the image processing performed on the evaluation image in FIG. 19. (a) to (d) of FIG. 22 illustrate images after Sobel filter processing is performed as the image processing. (e) to (h) of FIG. 22 illustrate images after Hough transform processing is performed as the image processing. (a) and (e) of FIG. 22 illustrate images after the image processing is performed on the evaluation image corresponding to the lighting pattern No. 29. (b) and (f) of FIG. 22 illustrate images after the image processing is performed on the evaluation image corresponding to the lighting pattern No. 7. (c) and (g) of FIG. 22 illustrate images after the image processing is performed on the evaluation image corresponding to the lighting pattern No. 44. (d) and (h) of FIG. 22 illustrate images after the image processing is performed on the evaluation image corresponding to the lighting pattern No. 40.

As illustrated in FIG. 22, when the Sobel filter processing is performed, even an edge included in the background is emphasized. As a result, when the image having the low uniformity of the background is used, it becomes difficult to distinguish between the defect portion and the background, and the defect portion cannot be accurately detected. Consequently, when the image measurement including the Sobel filter processing is performed, the user may select the second algorithm of the background uniformity level $\lambda=5$. As a result, the lighting pattern No. 40 having the high uniformity of the background is determined as the measurement lighting pattern.

On the other hand, when the Hough transform processing is performed, the influence is almost not on the background, but the defect portion tends to be thin. As a result, when the image having the small difference between the defect portion and the background is used, the defect portion cannot be accurately detected. Consequently, when the image measurement including the Hough transform processing is performed, the user may select the first algorithm. As a result, the lighting pattern No. 29 having the large difference between the defect portion and the background is determined as the measurement lighting pattern.

K. Action and Effect

As described above, image processing system 1 of the embodiment performs the image measurement using the external appearance image of target W. Image processing system 1 includes camera 8 that images target W and lighting device 4 that includes the plurality of lighting elements 40 that irradiates target W with light and is capable of adjusting at least one of the emission intensity and the emission color for each lighting element 40. Image processing system 1 further includes image acquisition unit 210, evaluation algorithm selection unit 220, calculation unit 230, and lighting pattern determination unit 240. Image acquisition unit 210 emits the illumination light from lighting device 4 according to each of the plurality of evaluation lighting patterns different from each other, and acquires at least one evaluation image corresponding to each evaluation lighting pattern from camera 8. Evaluation algorithm selection unit 220 selects one target algorithm from the plurality of evaluation algorithms. For each evaluation lighting pattern, calculation unit 230 calculates the evaluation value indicating the adaptation to the image measurement using the target algorithm and the evaluation image corresponding to the evaluation lighting pattern. Lighting pattern determination unit 240 determines the lighting pattern to be used for the image measurement from among the plurality of evaluation lighting patterns based on the evaluation value.

According to the above configuration, the evaluation algorithm suitable for the image measurement is selected from the plurality of evaluation algorithms, so that the lighting pattern optimal for the image measurement is automatically determined as the measurement lighting pattern. Thus, the lighting setting of the illumination can be easily performed so as to be suitable for the image measurement using the external appearance image of target W.

The plurality of evaluation algorithms includes the first algorithm that outputs the evaluation value depending on the difference between at least one defect region and at least one background region in the evaluation image and at least one second algorithm that outputs the evaluation value depending on the uniformity of at least one background region.

As described above, in the image measurement detecting the defect on the surface of target W, the image processing is performed in order to emphasize the defect portion. When the image processing capable of emphasizing the background together with the defect portion is performed, the lighting pattern in which the background is as uniform as possible is preferable. In such a case, the second algorithm is selected as the target algorithm, so that the lighting pattern that makes the background uniform can be determined as the measurement lighting pattern.

On the other hand, when the image processing in which the background is not so emphasized is performed, the lighting pattern in which the difference between the defect region and the background region increases is preferable. In such a case, the first algorithm is selected as the target algorithm, so that the lighting pattern in which the difference between the defect region and the background region increases can be determined as the measurement lighting pattern.

The at least one second algorithm includes a plurality of second algorithms having different contribution rates of the uniformity of the background to the evaluation value.

According to the above configuration, the second algorithm having the contribution rate suitable for the image measurement can be appropriately selected from the plurality of second algorithms. Thus, the lighting pattern suitable for the image measurement is determined as the measurement lighting pattern.

The second algorithm calculates the evaluation value using threshold value $\kappa$ when the value (for example, $(\lambda/L)V^{1/2}$) corresponding to variance V of the luminance of the plurality of pixels belonging to the background region is smaller than threshold value $\kappa$. The second algorithm calculates the evaluation value using the value (for example, $(\lambda/L)V^{1/2}$) corresponding to variance V when the value (for example, $(\lambda/L)V^{1/2}$) corresponding to variance V is greater than or equal to threshold value $\kappa$. Threshold value $\kappa$ is set according to the second algorithm.

When the evaluation value is calculated using variance V, the influence degree of variance V on the evaluation value increases as variance V approaches zero. For example, when the evaluation value is calculated by a formula including variance V as the denominator, the evaluation value approaches infinity as variance V approaches zero. However, according to the above configuration, the evaluation value is calculated using threshold value $\kappa$ when the uniformity of the background is high to some extent, and the evaluation value is calculated using the value corresponding to variance V when the uniformity of the background is low. Thus, the appropriate evaluation value is calculated.

Image processing system 1 further includes touch panel 102 as a user interface. Calculation unit 230 determines the shape, size, and position of the defect region according to the input to touch panel 102. Furthermore, calculation unit 230 sets the same shape and size of the background region as the shape and size of the defect region, and determines the position of the background region according to the input to touch panel 102. Thus, the user does not need to set the shape and size of the background region by setting the shape, size, and position of the defect region. As a result, labor required for setting the background region is reduced.

Calculation unit 230 calculates the evaluation value for each of the plurality of evaluation images. Lighting pattern determination unit 240 extracts the lowest evaluation value having the lowest adaptation from the evaluation values for the plurality of evaluation images for each evaluation lighting pattern. Lighting pattern determination unit 240 determines the evaluation lighting pattern in which the lowest evaluation value having the highest adaptation is extracted from the plurality of evaluation lighting patterns as the measurement lighting pattern. Thus, the evaluation lighting pattern stably having the high adaptation is determined as the measurement lighting pattern.

The plurality of lighting patterns that can be taken by lighting device 4 are previously divided into a plurality of groups. Image acquisition unit 210 selects at least one group from the plurality of groups, and determines the plurality of lighting patterns belonging to the selected at least one group as a plurality of evaluation lighting patterns. Thus, even when the total number of lighting patterns that can be taken by lighting device 4 is enormous, the group suitable for the image measurement is selected, so that the time required for determining the measurement lighting pattern can be shortened.

For example, the plurality of lighting elements 40 are radially arranged along the first to Nth radial directions at equal angular intervals. N is an integer greater than or equal to 2. The plurality of groups include a first group including the plurality of lighting patterns in which the irradiation intensity of the first to Nth radial directions is uniform and a second group including the plurality of lighting patterns in which only the lighting element disposed in one of the first to Nth radial directions is turned on.

According to the above configuration, the target is installed near the center of the plurality of radially-arranged lighting elements 40 to select the first group, so that the irradiation direction of the illumination light to the target becomes uniform. Accordingly, the first group may be selected in the case of performing the image measurement in which the irradiation direction of the illumination light is preferably uniform. On the other hand, the second group may be selected in the case of performing the image measurement in which deviation in the irradiation direction of the illumination light is preferable.

The plurality of groups may further include a third group including the plurality of lighting patterns in which only lighting elements arranged along a pair of radial directions opposite to each other in the first to Nth radial directions are turned on. N is an integer greater than or equal to 4.

In addition, the plurality of groups may include a group including the plurality of lighting patterns in which the emission color of the plurality of lighting elements is white and a group including the plurality of lighting patterns in which the emission color of the plurality of lighting elements is a color other than white.

Evaluation algorithm selection unit 220 selects the target algorithm according to the input to touch panel 102. Thus, the user can select the evaluation algorithm suitable for the image measurement as the target algorithm.

L. Modifications

First Modification

In the above description, processor 110 (evaluation algorithm selection unit 220) selects the target algorithm according to the input to touch panel 102. However, processor 110 (evaluation algorithm selection unit 220) may automatically select the target algorithm according to the image measurement to be executed.

For example, control device 100 previously stores a table in which type information indicating the type is associated with identification information identifying the evaluation algorithm suitable for the type for each type of the image measurement. The table is previously produced by an experiment or the like. Processor 110 (evaluation algorithm selection unit 220) may read the identification information corresponding to the type of the image measurement to be executed from the table, and select the evaluation algorithm identified by the read identification information as the target algorithm.

Second Modification

The method for calculating the evaluation value is not limited to the above method. For example, when all of the defect regions and the background regions have the same shape and the same size, $\sigma_p$ in Formula (1) may be calculated using the following Formula (6) instead of Formula (2).

[Mathematical Formula 6]

$$\sigma_p^2 = \frac{1}{l_x l_y} \sum_{i=0}^{l_x-1} \sum_{j=0}^{l_y-1} (f(X_p + i, Y_p + j) - b(i, j))^2 \quad \text{Formula (6)}$$

b (i,j) represents an average value of the luminance values of the pixels (i,j) in the background regions $h_0$ to $h_{n-1}$ in Formula (6), and is represented by the following Formula (7).

[Mathematical Formula 7]

$$b(i, j) = \frac{1}{n} \sum_{q=0}^{n-1} f(x_q + i, y_q + j) \quad \text{Formula (7)}$$

Furthermore, variance V of the luminance values of all the pixels belonging to the background regions $h_0$ to $h_{n-1}$ may be calculated according to the following Formula (8) instead of Formula (4).

[Mathematical Formula 8]

$$V = \frac{1}{n l_x l_y} \sum_{q=0}^{n-1} \sum_{i=0}^{l_x-1} \sum_{j=0}^{l_y-1} (f(x_q + i, y_q + j) - b(i, j))^2 \quad \text{Formula (8)}$$

$\sigma'$ is calculated according to the above Formula (5) using variance V calculated according to Formula (8). Alternatively, $\sigma_p$ in Formula (1) may be calculated using the following Formula (9) instead of Formula (2).

[Mathematical Formula 9]

$$\sigma_p^2 = \frac{1}{l_x l_y} \sum_{i=0}^{l_x-1} \sum_{j=0}^{l_y-1} (f(X_p + i, Y_p + j) - a)^2 \quad \text{Formula (9)}$$

In Formula (9), a represents an average value of the luminance in the defect region $H_p$, and is represented by the following Formula (10).

[Mathematical Formula 10]

$$a = \frac{1}{l_x l_y} \sum_{i=0}^{l_x-1} \sum_{j=0}^{l_y-1} f(X_p + i, Y_p + j) \quad \text{Formula (10)}$$

$\sigma_p$ calculated using Formula (9) represents a standard deviation in the defect region $H_p$. Because the defect region $H_p$ includes the defect portion, $\sigma_p$ increases in the lighting pattern in which the defect portion is conspicuous, and the evaluation value also increases.

Third Modification

In the above description, for example, threshold value κ is previously set to 1. However, threshold value κ may be set according to the evaluation image corresponding to the evaluation lighting pattern. For example, threshold value κ is set as follows.

Processor 110 (calculation unit 230) calculates variance V for each evaluation lighting pattern according to the above Formula (4) or Formula (8). Then, processor 110 (calculation unit 230) may determine threshold value κ so as to satisfy, for example, both of the following conditions a, b. When a plurality of values can be taken as threshold value κ, for example, a median value of the plurality of values is determined as threshold value κ. (Condition a) $(1/L)V^{1/2} \geq \kappa$ is satisfied in 2% to 20% of the evaluation lighting patterns of all the evaluation lighting patterns.

(Condition b) $V^{1/2} \geq \kappa$ is satisfied in 80% to 100% of all evaluation lighting patterns.

Alternatively, processor 110 (calculation unit 230) may determine threshold value κ according to the input to touch panel 102. Thus, the user can set threshold value κ to a desired value.

Fourth Modification

In the above description, the plurality of evaluation algorithms include the first algorithm that calculates the evaluation value depending on the difference between the defect region and the background region and the second algorithm that calculates the evaluation value depending on the uniformity of the background region. However, the plurality of algorithms are not limited to these algorithms.

For example, the plurality of evaluation algorithms may calculate the evaluation value indicating an edge-likelihood of the pixel belonging to the designated region in the evaluation image using different edge patterns. The evaluation value indicating the edge-likeness is calculated using, for example, the method disclosed in Japanese Patent Laying-Open No. 7-220058 (PTL 2).

FIG. 23 is a view illustrating an example of eight edge patterns. As illustrated in FIG. 23, a window of 3×3=9 pixels is set for each edge pattern. Processor 110 (calculation unit 230) superimposes the window on 3×3 pixels in the evaluation image, and calculates the adaptation between the edge pattern and the image data in the window. Processor 110 (calculation unit 230) calculates the adaptation while moving the window in the horizontal direction and the vertical direction in the designated region of the evaluation image, and calculates a total value of the calculated adaptation. The designated region may be the entire region or a partial region of the evaluation image. The calculated total value of the adaptation represents the edge-likeness of the pixels belonging to the designated region.

Processor 110 (calculation unit 230) calculates a luminance difference Q (brightness difference) between the center pixel and each of the eight peripheral pixels in the window. Calculation unit 230 calculates the adaptation as follows using luminance difference Q.

FIG. 23 illustrates a fuzzy model of each edge pattern represented using a membership function. In FIG. 23, N represents negative, Z represents zero, and P represents positive.

The membership function N takes a function value of one in the range where luminance difference Q is smaller than a certain negative value −Qb, takes a value of zero in the range where luminance difference Q is larger than zero, and takes a value from one to zero that linearly changes corresponding to the value in the range from −Qb to zero.

In the membership function P, the function value takes the value of zero in the range where luminance difference Q is smaller than zero, takes the value of one in the range where luminance difference Q is larger than a certain positive value Qb, and takes the value between zero to one that linearly changes corresponding to the value in the range of zero to Qb.

The membership function Z has the function value of zero in the range where the absolute value of luminance difference Q is larger than a certain value Qa, and has the function value of 1 in the range where the absolute value is smaller than Qb. Then, in the range where the absolute value of luminance difference Q is larger than Qb and smaller than Qa, the function value is an intermediate value from one to zero that linearly changes corresponding to the absolute value of luminance difference Q.

The fuzzy model in (a) of FIG. 23 represents a right upward oblique edge pattern that is bright in the lower right direction and is dark in the upper left direction. The fuzzy model illustrated in (b) of FIG. 23 represents an edge pattern that is bright in the right direction, is dark in the left direction, and extends in the vertical direction. The fuzzy model illustrated in (c) of FIG. 23 represents a right downward oblique edge pattern that is bright in the upper right direction and is dark in the lower left direction. The fuzzy model illustrated in (d) of FIG. 23 represents an edge pattern that is bright in the upward direction, is dark in the downward direction, and extends in the horizontal direction. The fuzzy model illustrated in (e) of FIG. 23 represents a right upward oblique edge pattern that is bright in the upper left direction and is dark in the lower right direction. The fuzzy model illustrated in (f) of FIG. 23 represents an edge pattern that is bright in the left direction, is dark in the right direction, and extends in the vertical direction. The fuzzy model illustrated in (g) of FIG. 23 represents a right downward oblique edge pattern that is bright in the upper left direction and is dark in the lower right direction. The fuzzy model illustrated in (h) of FIG. 23 represents an edge pattern that is bright in the downward direction, is dark in the upward direction, and extends in the horizontal direction.

For example, the following third to sixth algorithms are previously set as the plurality of evaluation algorithms, and the user selects one of the third to sixth algorithms as the target algorithm. The third algorithm outputs the total value of the adaptation calculated using the edge patterns in (a) and (e) of FIG. 23 as the evaluation value. The fourth algorithm outputs the total value of the adaptation calculated using the edge patterns in (b) and (f) of FIG. 23 as the evaluation value. The fifth algorithm outputs the total value of adaptation calculated using the edge patterns in (c) and (g) of FIG. 23 as the evaluation value. The sixth algorithm outputs the total value of adaptation calculated using the edge patterns in (d) and (h) of FIG. 23 as the evaluation value.

It is assumed that a plurality of lines along one direction are formed on the surface of target W, and that the image processing for emphasizing the lines is executed in the image measurement. In this case, the evaluation lighting pattern that makes the line conspicuous is preferable. Accordingly, the user may select the evaluation algorithm according to the direction of the line.

For example, when the line is in the vertical direction, the fourth algorithm is selected. The fourth algorithm calculates the adaptation using the edge patterns in (b) and (f) of FIG. 23, and outputs the total value of the calculated adaptation as the evaluation value. That is, the evaluation value indicates the edge-likelihood in the vertical direction. Consequently, by selecting the fourth algorithm, the evaluation lighting pattern that makes the vertical line conspicuous is determined as the measurement lighting pattern.

Fifth Modification

In the above description, the shape of lighting device 4 has the dome shape. However, the shape of lighting device 4 is not limited to the dome shape, but may be, for example, a flat surface or a linear shape. The illumination light may be reflected by a half mirror to irradiate the target. For example, the light sources may be arranged in a matrix shape in lighting device 4, and lighting device 4 may be divided into a plurality of lighting elements.

In addition, in lighting device 4 of FIG. 3, it is also assumed that the emission directions of the light from lighting element 40 are all directed to the center. However, the emission directions of the light from the plurality of lighting elements are not limited thereto, but may be directed different from each other.

The light emitted by each lighting element may provide a different polarization characteristic. Specifically, five kinds of characteristics including non-polarized light can be provided by mounting linear polarizing filters of 0 degrees, 45 degrees, 90 degrees, and 135 degrees on the emission surface (outside the diffusion plate) of lighting element.

§ 3 Another Application Example

Figure 24:
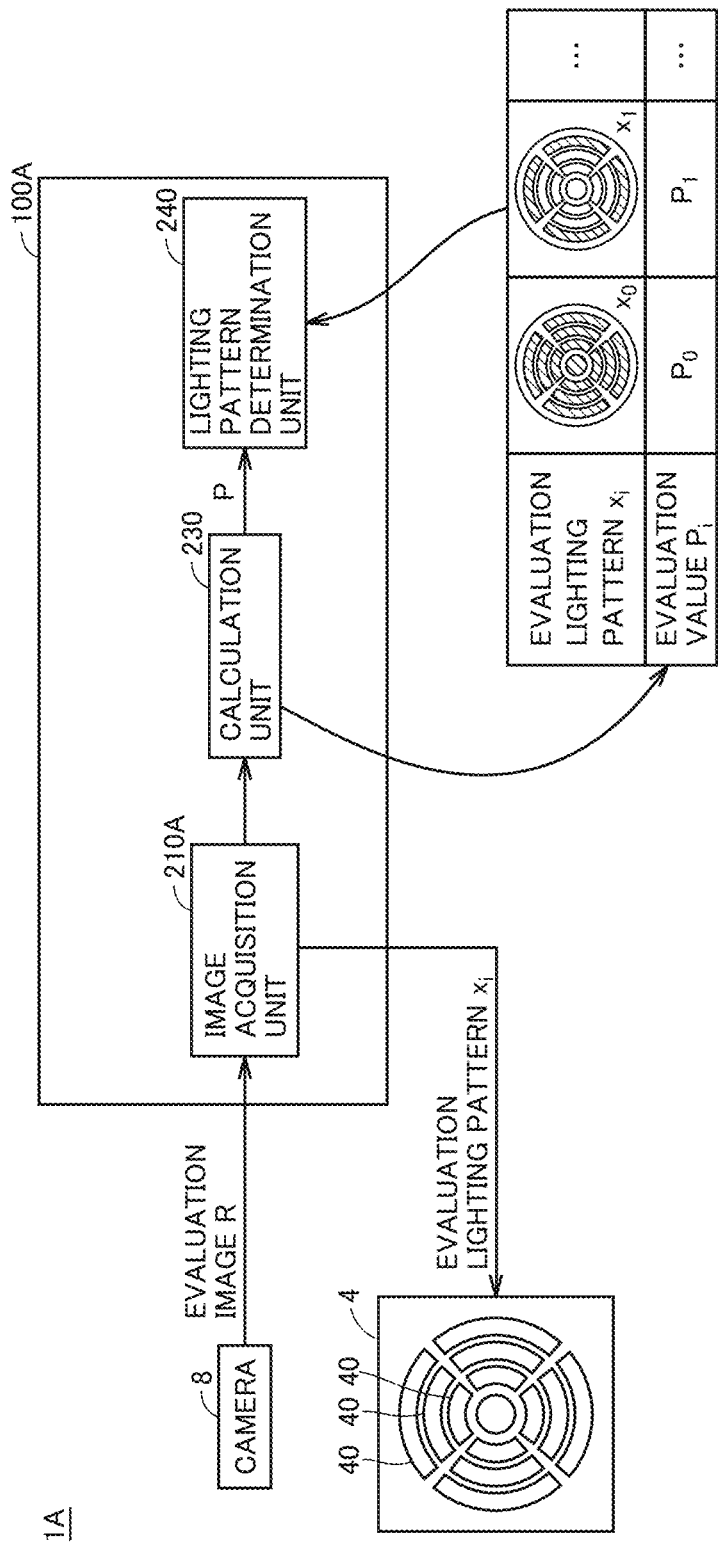
FIG. 24 is a view illustrating another configuration example of the image processing system.

With reference to FIG. 24, another application example of the present invention will be described. FIG. 24 is a view illustrating another configuration example of the image processing system.

In the technique disclosed in PTL 1, a lighting angle optimizing the evaluation value is calculated based on captured images obtained by imaging the article at a plurality of lighting angles. At this point, the plurality of lighting angles are previously determined. However, in the case of the use of the lighting device having many settable conditions such as the color and direction of the lighting, a large number of lighting patterns exists, and it takes time required for optimization when all the lighting patterns are evaluated. On the other hand, when only the predetermined lighting pattern among the large number of lighting patterns is evaluated, the lighting pattern that is not evaluated may be more suitable. As a result, the optimization becomes insufficient.

The present disclosure has been made in view of such the problem, and the object of the present disclosure is to provide the image processing system, the setting method, and the program capable of more appropriately setting the lighting of illumination so as to be suitable for the image measurement using the external appearance image of the target.

An image processing system 1A in FIG. 24 includes a control device 100A instead of control device 100 as compared with image processing system 1 in FIG. 1.

Control device 100A typically has a structure according to a general-purpose computer architecture. Control device 100A is different from control device 100 in that the evaluation algorithm selection unit 220 is not provided and an image acquisition unit 210A is provided instead of image acquisition unit 210.

The plurality of lighting patterns that can be taken by lighting device 4 are previously divided into a plurality of groups. Image acquisition unit 210A selects at least one group from the plurality of groups according to the input to the user interface, and determines the plurality of lighting patterns belonging to the selected at least one group as a plurality of evaluation lighting patterns. Image acquisition unit 210A irradiates the target with the illumination light from lighting device 4 according to each of the plurality of selected evaluation lighting patterns xi, and acquires at least one evaluation image R corresponding to each evaluation lighting pattern xi from camera 8.

In image processing system 1A of FIG. 24, calculation unit 230 may calculate evaluation value Pi indicating the adaptation to the image measurement using the predetermined evaluation algorithm and the evaluation image R corresponding to the evaluation lighting pattern xi.

The specific example of image processing system 1A in FIG. 24 is common to, for example, the above-described "§ 2 specific example". That is, for example, the plurality of groups includes the first group in FIG. 8, the second group in FIG. 9, and the third group in FIG. 10. In addition, the plurality of groups may include a group including the plurality of lighting patterns in which the emission color of the plurality of lighting elements 40 is white and a group including the plurality of lighting patterns in which the emission color of the plurality of lighting elements 40 is a color other than white.

According to the image processing system 1A in FIG. 24, the group according to the image measurement can be selected from the plurality of groups. Thus, the time required for the optimization can be shortened as compared with the case of evaluating all of the plurality of lighting patterns that can be taken by lighting device 4. Furthermore, the group to be evaluated can be selected from the plurality of groups, so that the lighting pattern to be evaluated can be avoided becoming not to be evaluated. Thus, it is possible to achieve the image processing system capable of more appropriately setting the lighting of illumination so as to be suitable for the image measurement using the external appearance image of the target.

§ 4 Appendix

As described above, the embodiment includes the following disclosure.
(Configuration 1)

An image processing system (1) that performs image measurement using an external appearance image of a target (W), the image processing system (1) including:
    an imaging unit (8) configured to image the target (W);
    a lighting unit (4) including a plurality of lighting elements (40, 41, 42 to 45, 42L to 45L, 42M to 45M, 42U to 45U) that irradiates the target (W) with light, the lighting unit (4) being capable of adjusting at least one of emission intensity and emission color for each lighting element;

an image acquisition unit (110, 210) configured to emit illumination light from the lighting unit (4) according to each of a plurality of evaluation lighting patterns different from each other and acquire at least one evaluation image corresponding to each evaluation lighting pattern from the imaging unit;

a selection unit (110, 220) configured to select one target algorithm from a plurality of evaluation algorithms;

a calculation unit (110, 230) configured to calculate an evaluation value indicating adaptation to the image measurement for each evaluation lighting pattern using the target algorithm and the at least one evaluation image corresponding to the evaluation lighting pattern; and a pattern determination unit (110, 240) configured to determine a lighting pattern to be used for the image measurement from the plurality of evaluation lighting patterns based on the evaluation value.

(Configuration 2)

The image processing system (1) described in the configuration 1, wherein the plurality of evaluation algorithms includes: a first algorithm that outputs a first evaluation value depending on a difference between at least one first region and at least one second region in the at least one evaluation image as the evaluation value; and at least one second algorithm that outputs a second evaluation value depending on uniformity of the at least one second region as the evaluation value.

(Configuration 3)

The image processing system (1) described in the configuration 2, wherein the at least one second algorithm includes a plurality of second algorithms having different contribution rates of the uniformity to the second evaluation value.

(Configuration 4)

The image processing system (1) described in the configuration 2 or 3, wherein each of the at least one second algorithm outputs the second evaluation value using a threshold value when a value corresponding to variance of luminance of a plurality of pixels belonging to the at least one second region is smaller than the threshold value, outputs the second evaluation value using the value corresponding to the variance when the value corresponding to the variance is greater than or equal to the threshold value, and the threshold value is set according to the at least one second algorithm.

(Configuration 5)

The image processing system (1) described in any one of the configurations 2 to 4, further including a user interface (102), wherein the calculation unit (110, 230)

determines a shape, a size, and a position of the at least one first region according to input to the user interface (102), sets a shape and a size of the at least one second region to be identical to the shape and the size of the at least one first region, and determines a position of the at least one second region according to the input to the user interface (102).

(Configuration 6)

The image processing system (1) described in the configuration 1, wherein the plurality of evaluation algorithms outputs a third evaluation value indicating an edge-likelihood of a pixel belonging to a designated region in the at least one evaluation image using edge patterns different from each other as the evaluation value.

(Configuration 7)

The image processing system (1) described in any one of the configurations 1 to 6, wherein the at least one evaluation image includes a plurality of evaluation images, the calculation unit calculates the evaluation value for each of the plurality of evaluation images, the pattern determination unit (110, 240)

extracts a lowest evaluation value having a lowest adaptation from the evaluation values regarding the plurality of evaluation images for each evaluation lighting pattern; and determines an evaluation lighting pattern in which the lowest evaluation value having a highest adaptation is extracted from the plurality of evaluation lighting patterns as the lighting pattern to be used for the image measurement.

(Configuration 8)

The image processing system (1) described in any one of the configurations 1 to 7, wherein a plurality of lighting patterns that can be taken by the lighting unit (4) are previously divided into a plurality of groups, and the image acquisition unit (110, 210)

selects at least one group from the plurality of groups; and determines a plurality of lighting patterns belonging to the selected at least one group as the plurality of evaluation lighting patterns.

(Configuration 9)

The image processing system (1) described in the configuration 8, wherein the plurality of lighting elements (40, 41, 42 to 45, 42L to 45L, 42M to 45M, 42U to 45U) are radially arranged along first to Nth radial directions at equal angular intervals, N is an integer greater than or equal to 2, and the plurality of groups includes:

a first group including a plurality of lighting patterns in which irradiation intensities in the first to Nth radial directions are uniform; and a second group including a plurality of lighting patterns in which only the lighting element disposed in one of the first to Nth radial directions is turned on.

(Configuration 10)

The image processing system (1) described in the configuration 9, wherein N is an even number greater than or equal to 4, and the plurality of groups further includes a third group including a plurality of lighting patterns in which only lighting elements arranged along a pair of radial directions opposite to each other in the first to Nth radial directions are turned on.

(Configuration 11)

The image processing system (1) described in the configuration 8, wherein the plurality of groups includes:

a first group including a plurality of lighting patterns in which emission colors of the plurality of lighting elements are white; and a second group including a plurality of lighting patterns in which emission colors of the plurality of lighting elements are colors other than white.

(Configuration 12)

The image processing system (1) described in the configuration 1, further comprising a user interface (102), wherein the selection unit (110, 220) selects the target algorithm according to input to the user interface (102).

(Configuration 13)

A setting method for performing lighting setting of a lighting unit (4) that includes a plurality of lighting elements (40, 41, 42 to 45, 42L to 45L, 42M to 45M, 42U to 45U) irradiating a target (W) with light and is capable of adjusting at least one of emission intensity and emission color for each lighting element, the setting method comprising:

emitting illumination light from the lighting unit (4) according to each of a plurality of evaluation lighting patterns different from each other and acquiring at least one evaluation image corresponding to each evaluation lighting pattern from an imaging unit (8) that images the target (W);

selecting one target algorithm from a plurality of evaluation algorithms;

calculating an evaluation value indicating adaptation to image measurement in which an external appearance image of the target is used using the target algorithm and the at least one evaluation image corresponding to the evaluation lighting pattern for each evaluation lighting pattern; and determining a lighting pattern to be used for the image measurement from the plurality of evaluation lighting patterns based on the evaluation value.

(Configuration 14)

A program causing a computer to execute the setting method described in the configuration 13.

(Configuration 15)

An image processing system (1A) that performs image measurement using an external appearance image of a target (W), the image processing system (1A) including:

an imaging unit (8) configured to image the target (W);

a lighting unit (4) including a plurality of lighting elements (40, 41, 42 to 45, 42L to 45L, 42M to 45M, 42U to 45U) irradiating the target (W) with light, the lighting unit (4) being capable of adjusting at least one of emission intensity and emission color for each lighting element, a plurality of lighting patterns that can be taken by the lighting unit (4) being previously divided into a plurality of groups;

an image acquisition unit (110A, 210) configured to select at least one group from the plurality of groups, emit illumination light from the lighting unit (4) according to each of a plurality of evaluation lighting patterns belonging to the at least one group, and acquire at least one evaluation image corresponding to each evaluation lighting pattern from the imaging unit (8);

a calculation unit (110, 230) configured to calculate an evaluation value indicating adaptation to the image measurement for each evaluation lighting pattern using the at least one evaluation image corresponding to the evaluation lighting pattern; and a pattern determination unit (110, 240) configured to determine a lighting pattern to be used for the image measurement from the plurality of evaluation lighting patterns based on the evaluation value.

(Configuration 16)

The image processing system (1A) described in the configuration 15, wherein the plurality of lighting elements are radially arranged along first to Nth radial directions at equal angular intervals, N is an integer greater than or equal to 2, and the plurality of groups includes:

a first group including a plurality of lighting patterns in which irradiation intensities in the first to Nth radial directions are uniform; and a second group including a plurality of lighting patterns in which only the lighting element disposed in one of the first to Nth radial directions is turned on.

(Configuration 17)

The image processing system (1A) described in the configuration 16, wherein N is an even number greater than or equal to 4, and the plurality of groups further includes a third group including a plurality of lighting patterns in which only lighting elements arranged along a pair of radial directions opposite to each other in the first to Nth radial directions are turned on.

(Configuration 18)

The image processing system (1A) described in the configuration 15, wherein the plurality of groups includes:

a first group including a plurality of lighting patterns in which emission colors of the plurality of lighting elements are white; and a second group including a plurality of lighting patterns in which emission colors of the plurality of lighting elements are colors other than white.

(Configuration 19)

The image processing system (1A) described in any one of the configurations 15 to 18, further comprising a user interface (102), wherein the image acquisition unit (110A, 210) selects the at least one group according to input to the user interface (102).

(Configuration 20)

A setting method for performing lighting setting of a lighting unit (4) that includes a plurality of lighting elements (40, 41, 42 to 45, 42L to 45L, 42M to 45M, 42U to 45U) irradiating a target (W) with light and is capable of adjusting at least one of emission intensity and emission color for each lighting element, the setting method comprising:

a plurality of lighting patterns that can be taken by the lighting unit (4) being previously divided into a plurality of groups, selecting at least one group from the plurality of groups, emitting illumination light from the lighting unit (4) according to each of a plurality of evaluation lighting patterns belonging to the at least one group, and acquiring at least one evaluation image corresponding to each evaluation lighting pattern from an imaging unit (8) that images the target (W);

calculating an evaluation value indicating adaptation to image measurement using the at least one evaluation image corresponding to the evaluation lighting pattern for each evaluation lighting pattern; and determining a lighting pattern to be used for the image measurement from the plurality of evaluation lighting patterns based on the evaluation value.

(Configuration 21)

A program (150) causing a computer to execute the setting method described in the configuration 20.

Although the embodiment of the present invention have been described, it should be considered that the disclosed embodiments are an example in all respects and not restrictive. The scope of the present invention is indicated by the claims, and it is intended that all modifications within the meaning and scope of the claims are included in the present invention.

REFERENCE SIGNS LIST

1, 1A: image processing system, 4: lighting device, 8: camera, 40, 41, 42 to 45, 42L to 45L, 42M to 45M, 42U to 45U: lighting element, 46: opening, 47: reflection plate, 48: diffusion plate, 60: setting screen, 61, 62, 63: tab, 64, 65, 80: input field, 66 to 68, 78, 79, 82: check box, 69 to 72, 76, 77, 84, 86: button, 73, 74: display field, 75, 81, 83, 85: region, 90: defect portion, 91: edit button, 92: region shape selection button group, 93: size editing region, 94, 94a, 98, 98a, 98b: frame line, 95: change button, 96: OK button, 97: cancel button, 100, 100A: control device, 101: display, 102: touch panel, 110: processor, 112: RAM, 114: display controller, 116: system controller, 118: I/O controller, 120: hard disk, 122: device interface, 124: input interface, 128: communication interface, 130: memory card interface, 136: memory card, 150: control program, 210, 210A: image acquisition unit, 220: evaluation algorithm selection unit, 230: calculation unit, 240: lighting pattern determination unit, D1: first radial direction, D2: second radial direction, D3: third radial direction, D4: fourth radial direction, $H_0$ to $H_{m-1}$: defect region, R, Ri: evaluation image, S: sample image, W: target, $h_0$ to $h_{n-1}$: background region, and xi: evaluation lighting pattern.

The invention claimed is:

1. An image processing system that performs image measurement using an external appearance image of a target, the image processing system comprising:
   an imaging unit configured to image the target;
   a lighting unit including a plurality of lighting elements that irradiates the target with light, the lighting unit being capable of adjusting at least one of emission intensity and emission color for each lighting element;
   an image acquisition unit configured to emit illumination light from the lighting unit according to each of a plurality of evaluation lighting patterns different from each other and acquire at least one evaluation image corresponding to each evaluation lighting pattern from the imaging unit;
   a selection unit configured to select one target algorithm from a plurality of evaluation algorithms;
   a calculation unit configured to calculate an evaluation value indicating adaptation to the image measurement for each evaluation lighting pattern using the target algorithm and the at least one evaluation image corresponding to the evaluation lighting pattern; and
   a pattern determination unit configured to determine a lighting pattern to be used for the image measurement from the plurality of evaluation lighting patterns based on the evaluation value.

2. The image processing system according to claim 1, wherein the plurality of evaluation algorithms includes: a first algorithm that outputs a first evaluation value depending on a difference between at least one first region and at least one second region in the at least one evaluation image as the evaluation value; and at least one second algorithm that outputs a second evaluation value depending on uniformity of the at least one second region as the evaluation value.

3. The image processing system according to claim 2, wherein the at least one second algorithm includes a plurality of second algorithms having different contribution rates of the uniformity to the second evaluation value.

4. The image processing system according to claim 2, wherein
   each of the at least one second algorithm
   outputs the second evaluation value using a threshold value when a value corresponding to variance of luminance of a plurality of pixels belonging to the at least one second region is smaller than the threshold value,
   outputs the second evaluation value using the value corresponding to the variance when the value corresponding to the variance is greater than or equal to the threshold value, and
   the threshold value is set according to the at least one second algorithm.

5. The image processing system according to claim 2, further comprising a user interface,
   wherein the calculation unit
   determines a shape, a size, and a position of the at least one first region according to input to the user interface,
   sets a shape and a size of the at least one second region to be identical to the shape and the size of the at least one first region, and
   determines a position of the at least one second region according to the input to the user interface.

6. The image processing system according to claim 1, wherein the plurality of evaluation algorithms outputs a third evaluation value indicating an edge-likelihood of a pixel belonging to a designated region in the at least one evaluation image using edge patterns different from each other as the evaluation value.

7. The image processing system according to claim 1, wherein
   the at least one evaluation image includes a plurality of evaluation images,
   the calculation unit calculates the evaluation value for each of the plurality of evaluation images, and
   the pattern determination unit
   extracts a lowest evaluation value having a lowest adaptation from the evaluation values regarding the plurality of evaluation images for each evaluation lighting pattern; and
   determines an evaluation lighting pattern in which the lowest evaluation value having a highest adaptation is extracted from the plurality of evaluation lighting patterns as the lighting pattern to be used for the image measurement.

8. The image processing system according to claim 1, wherein
   a plurality of lighting patterns that can be taken by the lighting unit are previously divided into a plurality of groups, and
   the image acquisition unit
   selects at least one group from the plurality of groups; and
   determines a plurality of lighting patterns belonging to the selected at least one group as the plurality of evaluation lighting patterns.

9. The image processing system according to claim 8, wherein
   the plurality of lighting elements are radially arranged along first to Nth radial directions at equal angular intervals,
   N is an integer greater than or equal to 2, and
   the plurality of groups includes:
   a first group including a plurality of lighting patterns in which irradiation intensities in the first to Nth radial directions are uniform; and
   a second group including a plurality of lighting patterns in which only the lighting element disposed in one of the first to Nth radial directions is turned on.

10. The image processing system according to claim 9, wherein
N is an even number greater than or equal to 4, and
the plurality of groups further includes a third group including a plurality of lighting patterns in which only lighting elements arranged along a pair of radial directions opposite to each other in the first to Nth radial directions are turned on.

11. The image processing system according to claim 8, wherein
the plurality of groups includes:
a first group including a plurality of lighting patterns in which emission colors of the plurality of lighting elements are white; and
a second group including a plurality of lighting patterns in which emission colors of the plurality of lighting elements are colors other than white.

12. The image processing system according to claim 1, further comprising a user interface,
wherein the selection unit selects the target algorithm according to input to the user interface.

13. A setting method for performing lighting setting of a lighting unit that includes a plurality of lighting elements that irradiates a target with light and is capable of adjusting at least one of emission intensity and emission color for each lighting element, the setting method comprising:
emitting illumination light from the lighting unit according to each of a plurality of evaluation lighting patterns different from each other and acquiring at least one evaluation image corresponding to each evaluation lighting pattern from an imaging unit that images the target;
selecting one target algorithm from a plurality of evaluation algorithms;
calculating an evaluation value indicating adaptation to image measurement in which an external appearance image of the target is used using the target algorithm and the at least one evaluation image corresponding to the evaluation lighting pattern for each evaluation lighting pattern; and
determining a lighting pattern to be used for the image measurement from the plurality of evaluation lighting patterns based on the evaluation value.

14. A non-transitory computer-readable storage medium storing instructions that, when executed by at least one processor cause the at least one processor to execute the setting method according to claim 13.

* * * * *